United States Patent
Lee

(10) Patent No.: US 11,259,041 B2
(45) Date of Patent: *Feb. 22, 2022

(54) IMAGE DECODING METHOD AND APPARATUS BASED ON AFFINE MOTION PREDICTION IN IMAGE CODING SYSTEM

(71) Applicant: LG Electronics Inc., Seoul (KR)

(72) Inventor: Jaeho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/190,849

(22) Filed: Mar. 3, 2021

(65) Prior Publication Data

US 2021/0211711 A1 Jul. 8, 2021

Related U.S. Application Data

(63) Continuation of application No. 16/857,565, filed on Apr. 24, 2020, now Pat. No. 11,019,358, which is a continuation of application No. PCT/KR2019/008416, filed on Jul. 9, 2019.

(60) Provisional application No. 62/703,415, filed on Jul. 25, 2018, provisional application No. 62/698,001, filed on Jul. 13, 2018.

(51) Int. Cl.
*H04N 19/52* (2014.01)
*H04N 19/176* (2014.01)
*H04N 19/184* (2014.01)

(52) U.S. Cl.
CPC ........... *H04N 19/52* (2014.11); *H04N 19/176* (2014.11); *H04N 19/184* (2014.11)

(58) Field of Classification Search
CPC .... H04N 19/139; H04N 19/109; H04N 19/52; H04N 19/176; H04N 19/159
See application file for complete search history.

(56) References Cited

U.S. PATENT DOCUMENTS 10,638,152 B2 * 4/2020 Chuang ............... H04N 19/537
2017/0195685 A1 7/2017 Chen et al.
(Continued)

FOREIGN PATENT DOCUMENTS

KR 20140113855 A 9/2014

OTHER PUBLICATIONS

JVET-K0337: Joint Video Exploration Team (JVET) of ITU-T SG 16 WP 3 and ISO/IEC JTC 1/SC 29/WG 11; 11th Meeting Ljubljana, SI, Jul. 10-18, 2018, "CE4.1.3: Affine motion compensation," Qualcomm Incorporated (6 Pages).
(Continued)

*Primary Examiner* — Boubacar Abdou Tchoussou
(74) *Attorney, Agent, or Firm* — Dentons US LLP

(57) ABSTRACT

An image decoding method performed by a decoding apparatus includes the steps of: acquiring motion prediction information on a current block from a bitstream; generating an affine MVP candidate list including affine motion vector predictor candidates for the current block; deriving CPMVPs for CPs of the current block on the basis of one affine MVP candidate among the affine MVP candidates included in the affine MVP candidate list; deriving CPMVDs for the CPs of the current block on the basis of the motion prediction information; deriving CPMVs for the CPs of the current block on the basis of the CPMVPs and the CPMVDs; and deriving prediction samples for the current block on the basis of the CPMVs.

16 Claims, 20 Drawing Sheets

(56) References Cited

U.S. PATENT DOCUMENTS

| | | | |
|---|---|---|---|
| 2017/0332095 A1 | 11/2017 | Zou et al. | |
| 2018/0098062 A1 | 4/2018 | Li et al. | |
| 2018/0098063 A1* | 4/2018 | Chen | H04N 19/139 |
| 2019/0082191 A1* | 3/2019 | Chuang | H04N 19/423 |
| 2019/0104319 A1* | 4/2019 | Zhang | H04N 19/54 |
| 2019/0149838 A1* | 5/2019 | Zhang | H04N 19/105 375/240.16 |
| 2019/0208211 A1* | 7/2019 | Zhang | H04N 19/537 |
| 2020/0045322 A1* | 2/2020 | Ye | H04N 19/159 |
| 2020/0228821 A1* | 7/2020 | Chuang | H04N 19/52 |
| 2020/0288163 A1* | 9/2020 | Poirier | H04N 19/176 |

OTHER PUBLICATIONS

JVET-J0018: Joint Video Experts Team (JVET) of ITU-T SG 16 WP 3 and ISO/IEC JTC 1/SC 29/ WG 11 10th Meeting: San Diego, US Apr. 10-20, 2018, "Description of SDR video coding technology proposal by MediaTek," MediaTek Inc. (4 Pages).

JVET-L0141: "CE4: Simplified affine MVP list construction (Test4. 1.4)," Joint Video Experts Team (JVET) of ITU-T SG 16 WP3 and ISO/IEC JTC 1/SC 29/WG 11, 12th Meeting: Macau, China, Oct. 8-12, 2018, LG Electronics Inc. (7 Pages).

JVET-L0024-v2: "CE4: Summary report on inter prediction and motion vector coding," Joint Video Experts Team (JVET) of ITU-T SG 16 WP 3 and ISO/IEC JTC 1/SC 29/WG11, 12th Meeting: Macao, CN, Oct. 3-12, 2018) CE4 coordinators (48 Pages).

JVET-J0021: "Description of SDR, HDR and 360 degree video coding technology proposal by Qualcomm and Technicolor—low and high complexity versions," Joint Video Exploration Team (JVET) of ITU-T SG 16 WP3 and ISO/IEC JTC 1/SC 29/WG 11, 10th Meeting: San Diego, US Apr. 10-20, 2018, San Diego, Qualcomm, Technicolor (43 Pages).

JVET-J0022r1: "Description of SDR, HDR and 360 degree video coding technology proposal by Qualcomm and Technicolor—medium complexity versions," Joint Video Experts Team (JVET) of ITU-T SG 16 WP3 and ISO/IEC JTC 1/SC 29/WG 11, 10th Meeting: San Diego, US Apr. 10-20, 2018 (83 pages).

JVET-K0185-v2: "CE4: Affine inter prediction (Test 1.5)" Joint Video Experts Team (JVET) of ITU-T SG 16 WP3 and ISO/IEC JTC 1/SC 29/WG 11, 11th Meeting: Ljubljana, SI, Jul. 10-18, 2018: Huawei Technologies Co., Ltd. (13 Pages).

JVET-L0024-v2: "CE4: Summary report on inter prediction and motion vector coding," Joint Video Experts Team (JVET) of ITU-T SG 16 WP3 and ISO/IEC JTC 1/SC 29/WG11, 12th Meeting: Macao, CN, Oct. 3-12, 2018 (48 Pages).

* cited by examiner

Translate

Scale

Rotate

Shear

IMAGE DECODING METHOD AND APPARATUS BASED ON AFFINE MOTION PREDICTION IN IMAGE CODING SYSTEM

CROSS-REFERENCE TO RELATED APPLICATIONS

This application is a continuation of U.S. patent application Ser. No. 16/857,565 filed on Apr. 24, 2020, which is a continuation of International Application PCT/KR2019/008416, with an international filing date of Jul. 9, 2019, which claims the benefit of U.S. Provisional Applications No. 62/698,001 filed on Jul. 13, 2018, No. 62/703,415 filed on Jul. 25, 2018, the contents of which are all hereby incorporated by reference herein in their entirety.

BACKGROUND OF THE DISCLOSURE

Field of the Disclosure

The present disclosure relates to an image coding technology and, most particularly, to an image decoding method and apparatus based on affine motion prediction in an image coding system.

Related Art

Demand for high-resolution, high-quality images such as High Definition (HD) images and Ultra High Definition (UHD) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE DISCLOSURE

Technical Objects

A technical object of the present disclosure is to provide a method and apparatus that can enhance image coding efficiency.

Another technical object of the present disclosure is to derive an affine MVP candidate list of a current block based on neighboring blocks to which affine prediction is applied and, then, to provide an image decoding method and apparatus performing prediction for the current block based on the derived affine MVP candidate list.

Another technical object of the present disclosure is to derive an affine MVP candidate list of a current block by deriving a first affine MVP candidate list based on a left block group and by deriving a second affine MVP candidate list based on a top block group and, then, to provide an image decoding method and apparatus performing prediction for the current block based on the derived affine MVP candidate list.

Technical Solutions

According to an embodiment of the present disclosure, provided herein is a video decoding method performed by a decoding apparatus. The method includes the steps of obtaining motion prediction information for a current block from a bitstream, constructing an affine motion vector predictor (MVP) candidate list including affine MVP candidates for the current block, deriving control point motion vector predictors (CPMVPs) for control points (CPs) of the current block based on one of the affine MVP candidates included in the affine MVP candidate list, deriving control point motion vector differences (CPMVDs) for the CPs of the current block based on the motion prediction information, deriving control point motion vectors (CPMVs) for the CPs of the current block based on the CPMVPs and the CPMVDs, deriving prediction samples for the current block based on the CPMVs, and generating a reconstructed picture for the current block based on the derived prediction samples, wherein the affine MVP candidates include a first affine MVP candidate and a second affine MVP candidate, wherein the first affine MVP candidate is derived based on a first block in a left block group including a bottom-left corner neighboring block and a left neighboring block, wherein the first block is coded with an affine motion model and a reference picture of the first block is same as a reference picture of the current block, wherein the second affine MVP candidate is derived based on a second block in a top block group including a top-right corner neighboring block, a top neighboring block, and a top-left corner neighboring block, and wherein the second block is coded with the affine motion model and a reference picture of the second block is same as the reference picture of the current block.

According to another embodiment of the present disclosure, provided herein is a decoding apparatus performing a video decoding method. The decoding apparatus includes an entropy encoder obtaining motion prediction information for a current block from a bitstream, a predictor constructing an affine motion vector predictor (MVP) candidate list including affine MVP candidates for the current block, deriving control point motion vector predictors (CPMVPs) for control points (CPs) of the current block based on one of the affine MVP candidates included in the affine MVP candidate list, deriving control point motion vector differences (CPMVDs) for the CPs of the current block based on the motion prediction information, deriving control point motion vectors (CPMVs) for the CPs of the current block based on the CPMVPs and the CPMVDs, and deriving prediction samples for the current block based on the CPMVs, and an adder generating a reconstructed picture for the current block based on the derived prediction samples, wherein the affine MVP candidates include a first affine MVP candidate and a second affine MVP candidate, wherein the first affine MVP candidate is derived based on a first block in a left block group including a bottom-left corner neighboring block and a left neighboring block, wherein the first block is coded with an affine motion model and a reference picture of the first block is same as a reference picture of the current block, wherein the second affine MVP candidate is derived based on a second block in a top block group including a top-right corner neighboring block, a top neighboring block, and a top-left corner neighboring block, and wherein the second block is coded with the affine motion model and a reference picture of the second block is same as the reference picture of the current block.

According to another embodiment of the present disclosure, provided herein is a video encoding method performed by an encoding apparatus. The method includes the steps of constructing an affine motion vector predictor (MVP) candidate list including affine MVP candidates for a current block, deriving control point motion vector predictors (CPMVPs) for control points (CPs) of the current block based on one of the affine MVP candidates included in the affine MVP candidate list, deriving control point motion vectors (CPMVs) for the CPs of the current block, deriving control point motion vector differences (CPMVDs) for the CPs of the current block based on the CPMVPs and the CPMVs, and encoding motion prediction information including information on the CPMVDs, wherein the affine MVP candidates include a first affine MVP candidate and a second affine MVP candidate, wherein the first affine MVP candidate is derived based on a first block in a left block group including a bottom-left corner neighboring block and a left neighboring block, wherein the first block is coded with an affine motion model and a reference picture of the first block is same as a reference picture of the current block, wherein the second affine MVP candidate is derived based on a second block in a top block group including a top-right corner neighboring block, a top neighboring block, and a top-left corner neighboring block, and wherein the second block is coded with the affine motion model and a reference picture of the second block is same as the reference picture of the current block.

According to another embodiment of the present disclosure, provided herein is an encoding apparatus performing a video encoding method. The encoding apparatus includes a predictor constructing an affine motion vector predictor (MVP) candidate list including affine MVP candidates for a current block, deriving control point motion vector predictors (CPMVPs) for control points (CPs) of the current block based on one of the affine MVP candidates included in the affine MVP candidate list, and deriving control point motion vectors (CPMVs) for the CPs of the current block, a subtractor deriving control point motion vector differences (CPMVDs) for the CPs of the current block based on the CPMVPs and the CPMVs, and an entropy encoder encoding motion prediction information including information on the CPMVDs, wherein the affine MVP candidates include a first affine MVP candidate and a second affine MVP candidate, wherein the first affine MVP candidate is derived based on a first block in a left block group including a bottom-left corner neighboring block and a left neighboring block, wherein the first block is coded with an affine motion model and a reference picture of the first block is same as a reference picture of the current block, wherein the second affine MVP candidate is derived based on a second block in a top block group including a top-right corner neighboring block, a top neighboring block, and a top-left corner neighboring block, and wherein the second block is coded with the affine motion model and a reference picture of the second block is same as the reference picture of the current block.

Effects of the Disclosure

According to the present disclosure, an overall image/video compression efficiency may be enhanced.

According to the present disclosure, efficiency in image coding based on affine motion prediction may be enhanced.

According to the present disclosure, when deriving an affine MVP candidate list, neighboring blocks are divided into a left block group and a top block group, and an affine MVP candidate list may be constructed by deriving MVP candidates from each block group. Thus, the complexity in the process of constructing the affine MVP candidate list may be reduced, and the coding efficiency may be enhanced.

DESCRIPTION OF EXEMPLARY EMBODIMENTS

Figure 1:
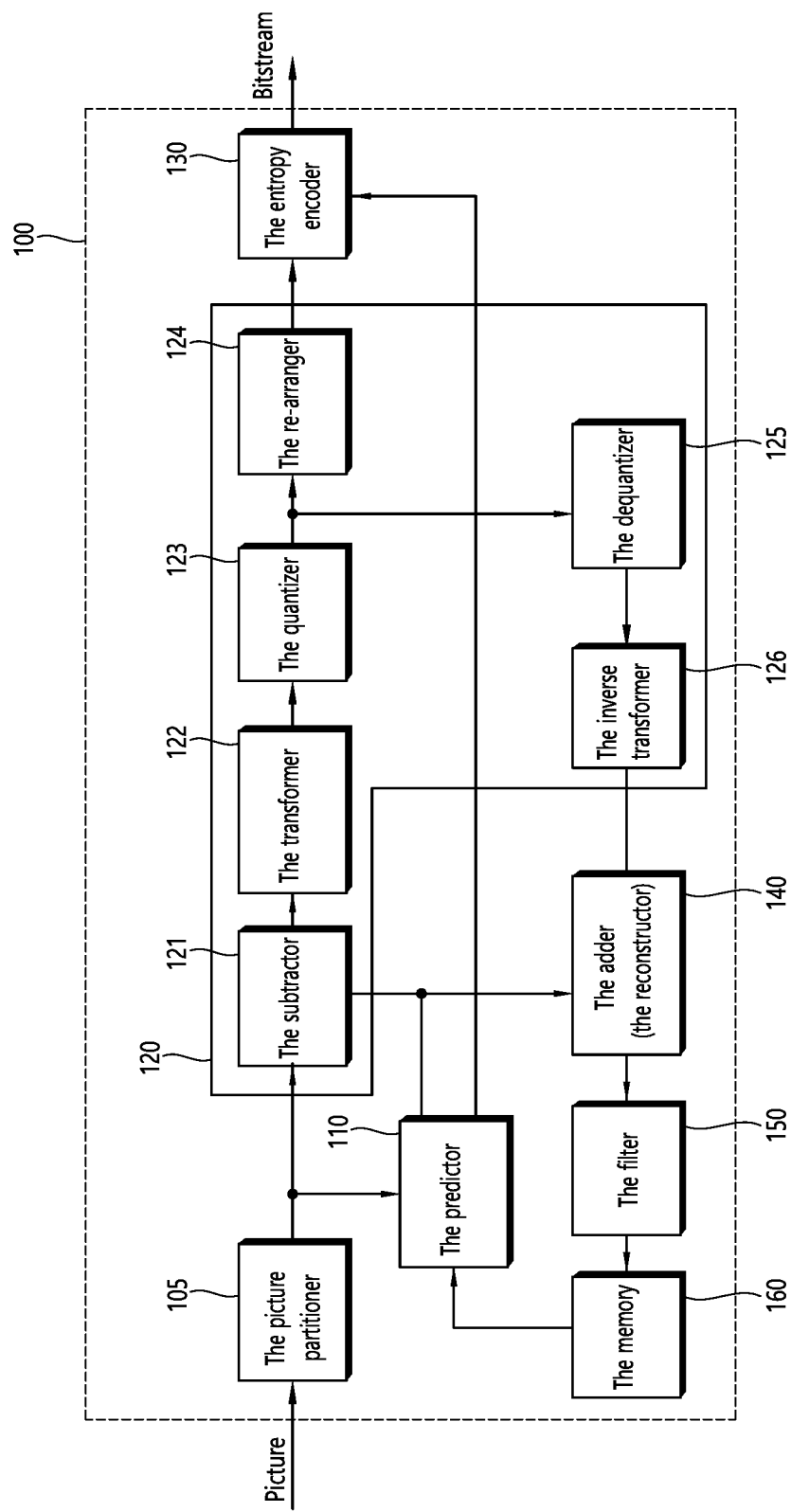
FIG. 1 is a schematic diagram illustrating a configuration of a video encoding apparatus to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

Meanwhile, the present disclosure relates to video/image coding. For example, the method(s)/embodiment(s) disclosed in the present disclosure may be applied to a method disclosed in a versatile video coding (VVC) standard or a next generation video/image coding standard.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 is a schematic diagram illustrating a configuration of a video encoding device to which the present disclosure is applicable.

Referring to FIG. 1, a video encoding device (100) may include a picture partitioner (105), a predictor (110), a residual processor (120), an entropy encoder (130), an adder (140), a filter (150), and a memory (160). The residual processor (120) may include a subtractor (121), a transformer (122), a quantizer (123), a re-arranger (124), a dequantizer (125), an inverse transformer (126).

The picture partitioner (105) may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present disclosure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor (110) may perform prediction on a processing target block (hereinafter, a current block), and may generate a predicted block including prediction samples for the current block. A unit of prediction performed in the predictor (110) may be a coding block, or may be a transform block, or may be a prediction block.

The predictor (110) may determine whether intra-prediction is applied or inter-prediction is applied to the current block. For example, the predictor (110) may determine whether the intra-prediction or the inter-prediction is applied in unit of CU.

In case of the intra-prediction, the predictor (110) may derive a prediction sample for the current block based on a reference sample outside the current block in a picture to which the current block belongs (hereinafter, a current picture). In this case, the predictor (110) may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor (110) may determine the prediction mode to be applied to the current block by using the prediction mode applied to the neighboring block.

In case of the inter-prediction, the predictor (110) may derive the prediction sample for the current block based on a sample specified by a motion vector on a reference picture.

The predictor (110) may derive the prediction sample for the current block by applying any one of a skip mode, a merge mode, and a motion vector prediction (MVP) mode. In case of the skip mode and the merge mode, the predictor (110) may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor (121) generates a residual sample which is a difference between an original sample and a prediction sample. If the skip mode is applied, the residual sample may not be generated as described above.

The transformer (122) transforms residual samples in units of a transform block to generate a transform coefficient. The transformer (122) may perform transformation based on the size of a corresponding transform block and a prediction mode applied to a coding block or prediction block spatially overlapping with the transform block. For example, residual samples can be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer (123) may quantize the transform coefficients to generate quantized transform coefficients.

The re-arranger (124) rearranges quantized transform coefficients. The re-arranger (124) may rearrange the quantized transform coefficients in the form of a block into a one-dimensional vector through a coefficient scanning method. Although the re-arranger (124) is described as a separate component, the re-arranger (124) may be a part of the quantizer (123).

The entropy encoder (130) may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder (130) may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer (125) dequantizes values (transform coefficients) quantized by the quantizer (123) and the inverse transformer (126) inversely transforms values dequantized by the dequantizer (125) to generate a residual sample.

The adder (140) adds a residual sample to a prediction sample to reconstruct a picture. The residual sample may be added to the prediction sample in units of a block to generate a reconstructed block. Although the adder (140) is described as a separate component, the adder (140) may be a part of the predictor (110). Meanwhile, the adder (140) may be referred to as a reconstructor or reconstructed block generator.

The filter (150) may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter (150) may apply an adaptive loop filter (ALF) to the reconstructed picture. The ALF may be applied to the reconstructed picture to which deblocking filtering and/or sample adaptive offset has been applied.

The memory (160) may store a reconstructed picture (decoded picture) or information necessary for encoding/decoding. Here, the reconstructed picture may be the reconstructed picture filtered by the filter (150). The stored reconstructed picture may be used as a reference picture for (inter) prediction of other pictures. For example, the memory (160) may store (reference) pictures used for inter-prediction. Here, pictures used for inter-prediction may be designated according to a reference picture set or a reference picture list.

Figure 2:
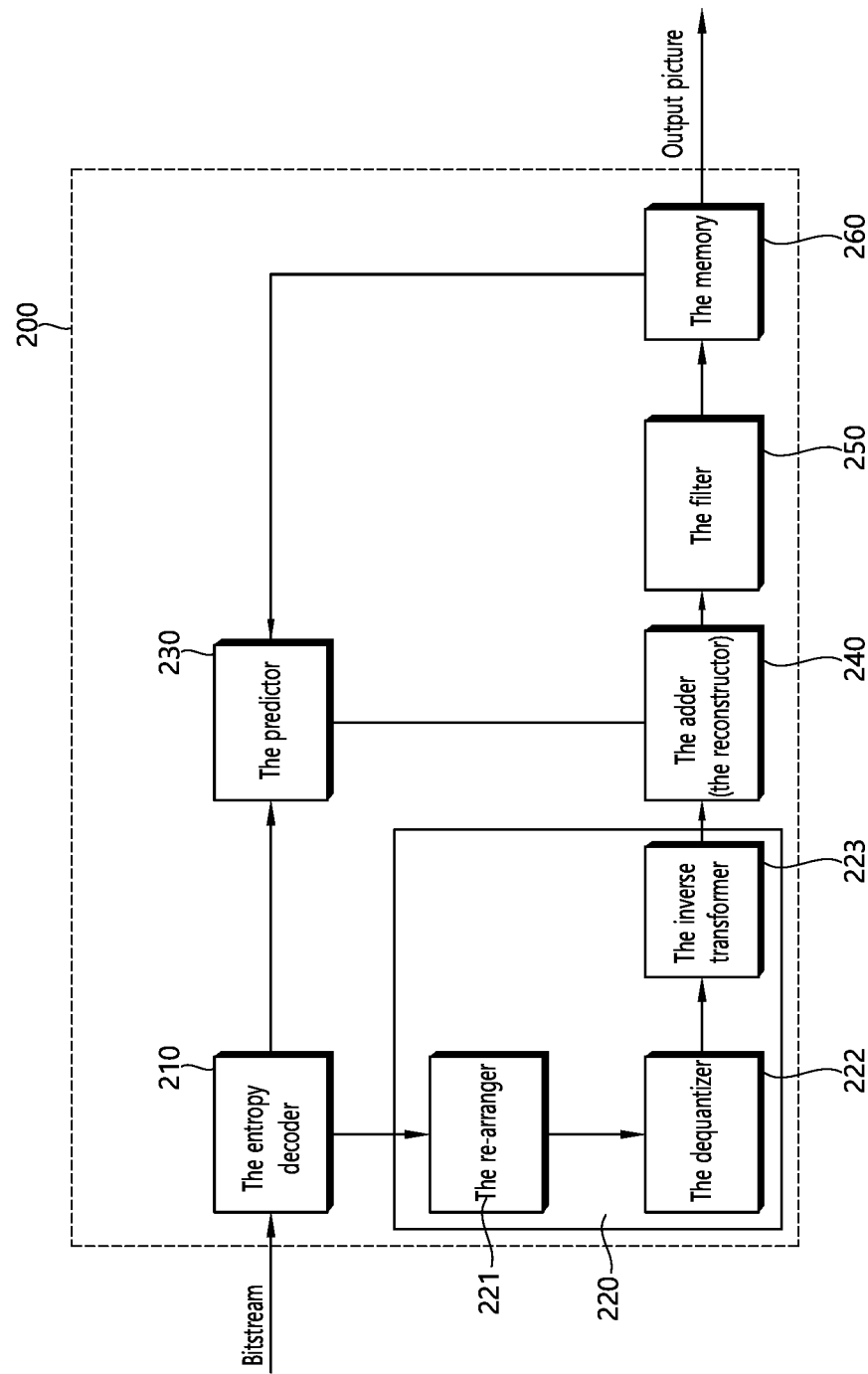
FIG. 2 is a schematic diagram illustrating a configuration of a video decoding apparatus to which the present disclosure is applicable.

FIG. 2 is a schematic diagram illustrating a configuration of a video decoding device to which the present disclosure is applicable.

Referring to FIG. 2, a video decoding device (200) may include an entropy decoder (210), a residual processor (220), a predictor (230), an adder (240), a filter (250), and a memory (260). The residual processor (220) may include a re-arranger (221), a dequantizer (222), an inverse transformer (223).

When a bitstream including video information is input, the video decoding device (200) may reconstruct a video in relation to a process by which video information is processed in the video encoding device.

For example, the video decoding device (200) may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder (210) may parse the bitstream to output information required for video reconstruction or picture reconstruction. For example, the entropy decoder (210) may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information on prediction among information decoded in the entropy decoder (210) may be provided to the predictor (230) and residual values, that is, quantized transform coefficients, on which entropy decoding has been performed by the entropy decoder (210) may be input to the re-arranger (221).

The re-arranger (221) may rearrange the quantized transform coefficients into a two-dimensional block form. The re-arranger (221) may perform rearrangement corresponding to coefficient scanning performed by the encoding device. Although the re-arranger (221) is described as a separate component, the re-arranger (221) may be a part of the dequantizer (222).

The dequantizer (222) may de-quantize the quantized transform coefficients based on a (de)quantization parameter to output a transform coefficient. In this case, information for deriving a quantization parameter may be signaled from the encoding device.

The inverse transformer (223) may inverse-transform the transform coefficients to derive residual samples.

The predictor (230) may perform prediction on a current block, and may generate a predicted block including prediction samples for the current block. A unit of prediction performed in the predictor (230) may be a coding block or may be a transform block or may be a prediction block.

The predictor (230) may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor (230) may derive a prediction sample for a current block based on a neighboring reference sample in a current picture. The predictor (230) may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor (230) may derive a prediction sample for a current block based on a sample specified in a reference picture according to a motion vector. The predictor (230) may derive the prediction sample for the current block using one of the skip mode, the merge mode and the MVP mode. Here, motion information required for inter-prediction of the current block provided by the video encoding device, for example, a motion vector and information on a reference picture index may be obtained or derived based on the information on prediction.

In the skip mode and the merge mode, motion information of a neighboring block may be used as motion information of the current block. Here, the neighboring block may include a spatial neighboring block and a temporal neighboring block.

The predictor (230) may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information on prediction may include a merge index indicating a candidate block having the best motion vector selected from candidate blocks included in the merge candidate list. Here, the predictor (230) may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information on prediction may include a prediction motion vector index indicating the best motion vector selected from motion vector candidates included in the list. Here, the predictor (230) may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor (230) may obtain a motion vector included in the information on prediction and derive the motion vector of the current block by adding the motion vector difference to the motion vector predictor. In addition, the predictor may obtain or derive a reference picture index indicating a reference picture from the aforementioned information on prediction.

The adder (240) can add a residual sample to a prediction sample to reconstruct a current block or a current picture. The adder (240) may reconstruct the current picture by adding the residual sample to the prediction sample in units of a block. When the skip mode is applied, a residual is not transmitted and thus the prediction sample may become a reconstructed sample. Although the adder (240) is described as a separate component, the adder (240) may be a part of the predictor (230). Meanwhile, the adder (240) may be referred to as a reconstructor or reconstructed block generator.

The filter (250) may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory (260) may store a reconstructed picture (decoded picture) or information necessary for decoding. Here, the reconstructed picture may be the reconstructed picture filtered by the filter (250). For example, the memory (260) may store pictures used for inter-prediction. Here, the pictures used for inter-prediction may be designated according to a reference picture set or a reference picture list. A reconstructed picture may be used as a reference picture for other pictures. The memory (260) may output reconstructed pictures in an output order.

Meanwhile, in the case of inter prediction, an inter prediction method considering distortion of an image has been proposed. Specifically, an affine motion model has been proposed to efficiently derive a motion vector for sub-blocks or sample points of a current block and to increase accuracy of inter prediction despite deformation of image rotation, zoom-in or zoom-out. That is, an affine motion model which derives a motion vector for sub-blocks or sample points of a current block has been proposed. Prediction using the affine motion model may be called affine inter prediction or affine motion prediction.

For example, the affine inter prediction using the affine motion model may efficiently express four motions, that is, four deformations, as described below.

Figure 3:
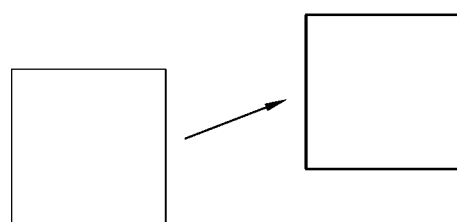
FIG. 3 illustrates a motion expressed through an affine motion model.
Figure 3:
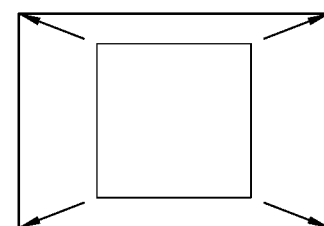
Figure 3:
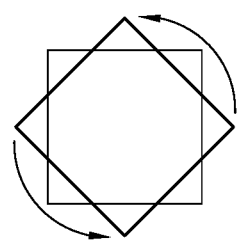
Figure 3:
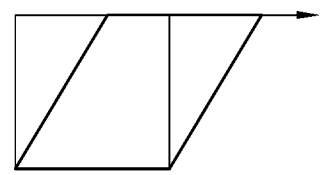

FIG. 3 illustrates a motion expressed through the affine motion model. Referring to FIG. 3, a motion that may be represented through the affine motion model may include a translational motion, a scale motion, a rotational motion, and a shear motion. That is, a scale motion in which (a portion of) an image is scaled according to the passage of time, a rotational motion in which (a portion of) an image is rotated according to the passage of time, and a shear motion in which (a portion of) an image is parallelogrammically deformed according to the passage of time, as well as the translational motion in which (a portion of) an image is planarly moved according to the passage of time illustrated in FIG. 3, may be effectively represented as illustrated in FIG. 3.

The encoding apparatus/decoding apparatus may predict a distortion shape of the image based on the motion vectors at control points (CPs) of the current block through the affine inter prediction the compression performance of the image may be improved by increasing accuracy of prediction. In addition, since a motion vector for at least one control point of the current block may be derived using a motion vector of a neighboring block of the current block, a burden of a data amount on additional information may be reduced and inter prediction efficiency may be improved considerably.

As an example of the affine inter prediction, motion information at three control points, that is, three reference points, may be required.

Figure 4:
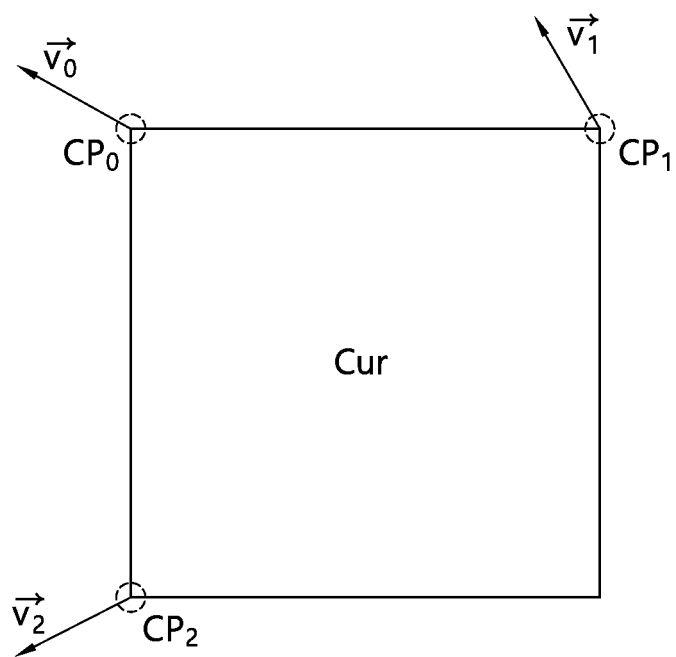
FIG. 4 illustrates the affine motion model in which motion vectors for 3 control points are used.

FIG. 4 illustrates the affine motion model in which motion vectors for three control points are used.

When a top-left sample position in a current block (400) is (0, 0), sample positions (0, 0), (w, 0), and (0, h) may be defined as the control points as shown in FIG. 4. Hereinafter, the control point of the sample position (0, 0) may be represented as CP0, the control point of the sample position (w, 0) may be represented as CP1, and the control point of the sample position (0, h) may be represented as CP2.

An equation for the affine motion model may be derived using the control points and the motion vectors of the corresponding control points described above. An equation for the affine motion model may be expressed as follows.

$$\begin{cases} v_x = \frac{(v_{1x} - v_{0x})}{w} * x + \frac{(v_{2x} - v_{0x})}{h} * y + v_{0x} \\ v_y = \frac{(v_{1y} - v_{0y})}{w} * x - \frac{(v_{2y} - v_{0y})}{h} * y + v_{0y} \end{cases} \quad \text{[Equation 1]}$$

Here, w denotes a width of the current block (400), h denotes a height of the current block (400), $v_{0x}$ and $v_{0y}$ denote an x component and y component of the motion vector of CP0, respectively, $v_{1x}$ and $v_{1y}$ denote an x component and a y component of the motion vector of CP1, respectively, and $v_{2x}$ and $v_{2y}$ denote an x component and a y component of the motion vector of CP2, respectively. In addition, x denotes an x component of a position of a target sample in the current block (400), y denotes a y component of the position of the target sample in the current block (400), $v_x$ denotes an x component of a motion vector of the target sample in the current block (400), and $v_y$ denotes a y component of the motion vector of the target sample in the current block (400).

Since the motion vector of CP0, the motion vector of CP1, and the motion vector of CP2 are known, a motion vector based on the sample position in the current block may be derived based on Equation 1. That is, according to the affine motion model, the motion vectors $v0(v_{0x}, v_{0y})$, $v1(v_{1x}, v_{1y})$, and $v2(v_{2x}, v_{2y})$ at the control points may be scaled based on a distance ratio between the coordinates (x, y) of the target sample and the three control points to derive the motion vectors of the target sample according to the position of the target sample. That is, according to the affine motion model, a motion vector of each sample in the current block may be derived based on the motion vectors of the control points. Meanwhile, a set of motion vectors of samples in the current block derived according to the affine motion model may be referred to as an affine motion vector field (MVF).

Meanwhile, six parameters for Equation 1 may be represented by a, b, c, d, e, and f as shown in Equation 1 below, and an equation for the affine motion model represented by the six parameters may be as follows.

$$a = \frac{(v_{1x} - v_{0x})}{w} \quad b = \frac{(v_{2x} - v_{0x})}{h} \quad c = v_{0x} \quad \text{[Equation 2]}$$
$$d = \frac{(v_{1y} - v_{0y})}{w} \quad e = -\frac{(v_{2y} - v_{0y})}{h} \quad f = v_{0y}$$

-continued $$\begin{cases} v_x = a*x + b*y + c \\ v_y = d*x + e*y + f \end{cases}$$

Here, w denotes a width of the current block (400), h denotes a height of the current block (400), $v_{0x}$ and $v_{0y}$ denote the x component of the motion vector of CP0, y components, v1x and v1y represent an x component and a y component of the motion vector of CP1, respectively, and $v_{2x}$ and $v_{2y}$ represent the x component and the y component of the motion vector of CP2, respectively. In addition, x denotes the x component of the position of the target sample in the current block (400), y denotes the y component of the position of the target sample in the current block (400), $v_x$ denotes the x component of the motion vector of the target sample in the current block (400), $v_y$ denotes the y component of the motion vector of the target sample in the current block (400).

The affine motion model or the affine inter prediction using the six parameters may be referred to as a 6-parameter affine motion model or AF6.

In addition, as an example of the affine inter prediction, motion information at two control points, i.e., two reference points, may be required.

Figure 5:
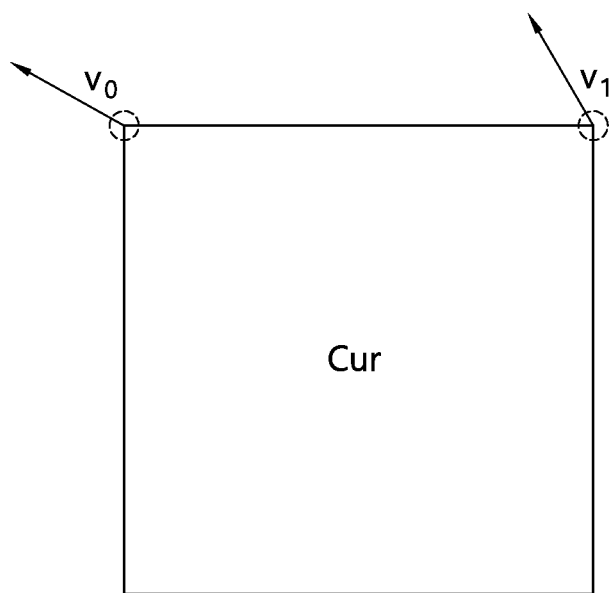
FIG. 5 illustrates an affine motion model in which motion vectors for 2 control points are used.

FIG. 5 illustrates the affine motion model in which motion vectors for two control points are used. The affine motion model using two control points may represent three motions including a translational motion, a scale motion, and a rotational motion. The affine motion model representing the three motions may be referred to as a similarity affine motion model or a simplified affine motion model.

When a top-left sample position in a current block (500) is (0, 0), sample positions (0, 0) and (w, 0) may be defined as the control points as shown in FIG. 5. Hereinafter, the control point of the sample position (0, 0) may be represented as CP0 and the control point of the sample position (w, 0) may be represented as CP1.

An equation for the affine motion model may be derived using the control points and the motion vectors of the corresponding control points described above. An equation for the affine motion model may be expressed as follows.

$$\begin{cases} v_x = \frac{(v_{1x} - v_{0x})}{w} * x - \frac{(v_{1y} - v_{0x})}{w} * y + v_{0x} \\ v_y = \frac{(v_{1y} - v_{0y})}{w} * x - \frac{(v_{1x} - v_{0y})}{w} * y + v_{0y} \end{cases} \quad \text{[Equation 3]}$$

Here, w denotes a width of the current block (500), $v_{0x}$ and $v_{0y}$ denote x and y components of the motion vector of CP0, respectively, and $v_{1x}$ and $v_{1y}$ denote x and y components of the motion vector of CP1. In addition, x denotes an x component of a position of a target sample in the current block (500), y denotes a y component of the position of the target sample in the current block (500), $v_x$ denotes an x component of the motion vector of the target sample in the current block (500), and $v_y$ denotes a y component of the motion vector of the target sample in the current block (500).

Meanwhile, four parameters of Equation 3 may be represented by a, b, c, and d as in the following Equation, and an equation for the affine motion model represented by the four parameters may be as follows.

$$a = \frac{(v_{1x} - v_{0x})}{w} \, b = \frac{(v_{1y} - v_{0y})}{w} \, c = v_{0x} \, d = v_{0y} \quad \text{[Equation 4]}$$

-continued $$\begin{cases} v_x = a*x - b*y + c \\ v_y = b*x + a*y + d \end{cases}$$

Here, w denotes a width of the current block (500), $v_{0x}$ and $v_{0y}$ denote x and y components of the motion vector of CP0, respectively, and $v_{1x}$ and $v_{1y}$ denote x and y components of the motion vector of CP1, respectively. In addition, x denotes an x component of a position of a target sample in the current block (500), y denotes a y component of the position of the target sample in the current block (500), $v_x$ denotes an x component of the motion vector of the target sample in the current block (500) and $v_y$ denotes a y component of the motion vector of the target sample in the current block (500). The affine motion model using the two control points may be represented by four parameters a, b, c, and d as shown in Equation 4, and thus, the affine motion model using the four parameters or the affine inter prediction may be referred to as a 4-parameter affine motion model or AF4. That is, according to the affine motion model, a motion vector of each sample in the current block may be derived based on the motion vectors of the control points. Meanwhile, a set of motion vectors of the samples in the current block derived according to the affine motion model may be referred to as an affine motion vector field (MVF).

Meanwhile, as described above, a motion vector of a sample unit may be derived through the affine motion model, and thus accuracy of inter prediction may be significantly improved. In this case, however, complexity in the motion compensation process may be significantly increased.

Accordingly, it may be limited such that a motion vector of a sub-block unit of the current block, instead of deriving a motion vector of the sample unit, is derived.

Figure 6:
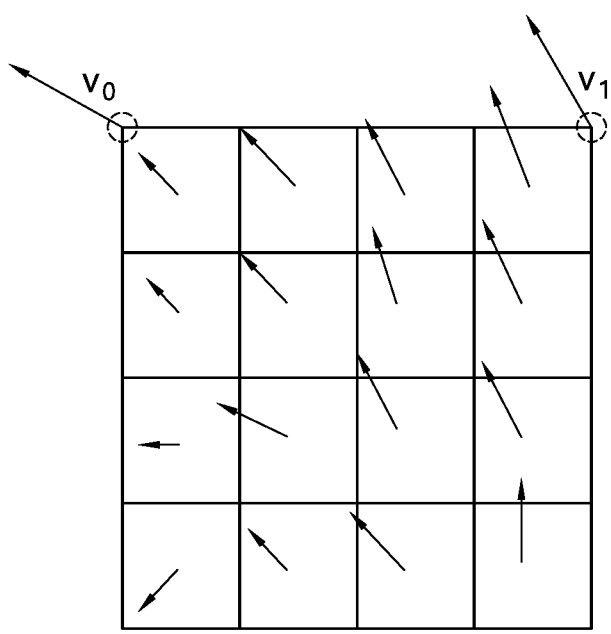
FIG. 6 illustrates a method of deriving a motion vector on a sub-block basis based on the affine motion model.

FIG. 6 illustrates a method of deriving a motion vector on a sub-block basis based on the affine motion model. FIG. 6 illustrates a case where a size of the current block is 16×16 and a motion vector is derived in units of 4×4 sub-blocks. The sub-block may be set to various sizes. For example, when the sub-block is set to n×n size (n is a positive integer, e.g., n is 4), a motion vector may be derived in units of n×n sub-blocks in the current block based on the affine motion model and various methods for deriving a motion vector representing each sub-block may be applied.

For example, referring to FIG. 6, a motion vector of each sub-block may be derived using the center or bottom right side sample position of each sub-block as a representative coordinate. Here, the center bottom right position may indicate a sample position positioned on the bottom right side among four samples positioned at the center of the sub-block. For example, when n is an odd number, one sample may be positioned at the center of the sub-block, and in this case, the center sample position may be used for deriving the motion vector of the sub-block. However, when n is an even number, four samples may be positioned to be adjacent at the center of the sub-block, and in this case, the bottom right sample position may be used to derive a motion vector. For example, referring to FIG. 6, representative coordinates of each sub-block may be derived as (2, 2), (6, 2), (10, 2), . . . , (14, 14), and encoding apparatus/decoding apparatus may derive the motion vector of each sub-block by substituting each of the representative coordinates of the sub-blocks into Equation 1 or 3 described above. The motion vectors of the sub-blocks in the current block derived through the affine motion model may be referred to as affine MVF.

Meanwhile, as an example, the size of the sub-block in the current block may be derived based on the following equation.

$$\begin{cases} M = \text{clip3}\left(4, w, \dfrac{w * MvPre}{\max(\text{abs}(v_{1x} - v_{0x}), \text{abs}(v_{1y} - v_{0y}))}\right) \\ N = \text{clip3}\left(4, h, \dfrac{h * MvPre}{\max(\text{abs}(v_{2x} - v_{0x}), \text{abs}(v_{2y} - v_{0y}))}\right) \end{cases} \quad [\text{Equation 5}]$$

Here, M denotes a width of the sub-block, and N denotes a height of the sub-block. In addition, $v_{0x}$ and $v_{0y}$ denote an x component and a y component of CPMV0 of the current block, $v_{1x}$ and $v_{1y}$ denote an x component and a y component of CPMV1 of the current block, w denotes a width of the current block, h denotes a height of the current block, and MvPre denotes a motion vector fraction accuracy. For example, the motion vector fraction accuracy may be set to $\frac{1}{16}$.

Meanwhile, in the inter prediction using the above-described affine motion model, that is, the affine motion prediction, may have an affine merge mode AF_MERGE and an affine inter mode AF_INTER. Here, the affine inter mode may be referred to as an affine MVP mode AF_MVP.

The affine merge mode is similar to an existing merge mode in that MVD for the motion vector of the control points is not transmitted. That is, similarly to the existing skip/merge mode, the affine merge mode may refer to an encoding/decoding method of performing prediction by deriving a CPMV for each of two or three control points from a neighboring block of the current block.

For example, when the AF_MRG mode is applied to the current block, MVs (i.e., CPMV0 and CPMV1) for CP0 and CP1 may be derived from the neighboring block to which the affine mode is applied among the neighboring blocks of the current block. That is, CPMV0 and CPMV1 of the neighboring block to which the affine mode is applied may be derived as merge candidates, and the merge candidates may be derived as CPMV0 and CPMV1 for the current block.

The affine inter mode may represent inter prediction of performing prediction based on an affine motion vector predictor (MVP) by deriving an MVP for a motion vector of the control points, driving a motion vector of the control points based on a motion vector difference (MOD) and the MVP, and driving an affine MVF of the current block based on the motion vector of the control points. Here, the motion vector of the control point may be represented as a control point motion vector (CPMV), the MVP of the control point may be represented as a control point motion vector predictor (CPMVP), and the MVD of the control point may be represented as a control point motion vector difference (CPMVD). Specifically, for example, the encoding apparatus may derive a control point motion vector predictor (CPMVP) and a control point motion vector (CPMV) for each of CP0 and CP1 (or CP0, CP1, and CP2) and transmit or store information on the CPMVP and/or the CPMVD, which is a difference between CPMVP and CPMV.

Here, when the affine inter mode is applied to the current block, the encoding apparatus/decoding apparatus may construct an affine MVP candidate list based on a neighboring block of the current block, the affine MVP candidate may be referred to as a CPMVP pair candidate, and the affine MVP candidate list may be referred to as a CPMVP candidate list.

In addition, each of the affine MVP candidates may refer to a combination of CPMVPs of CP0 and CP1 in a 4-parameter affine motion model and may refer to a combination of CPMVPs of CP0, CP1, and CP2 in a 6-parameter affine motion model.

Figure 7:
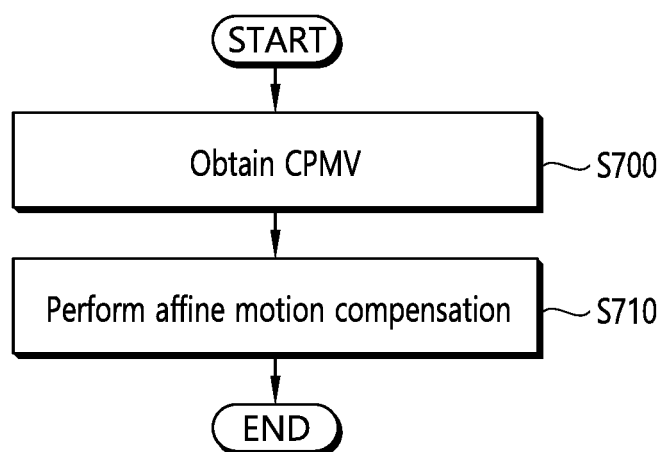
FIG. 7 is a flowchart illustrating an affine motion prediction method according to an embodiment of the present disclosure.

FIG. 7 is a flowchart illustrating an affine motion prediction method according to an embodiment of the present disclosure.

Referring to FIG. 7, the affine motion prediction method may be represented as follows. When the affine motion prediction method starts, first, a CPMV pair may be obtained (S700). Here, the CPMV pair may include CPMV0 and CPMV1 when using the 4-parameter affine model.

Thereafter, affine motion compensation may be performed based on the CPMV pair (S710), and affine motion prediction may be terminated.

In addition, there may be two affine prediction modes to determine the CPMV0 and the CPMV1. Here, the two affine prediction modes may include an affine inter mode and an affine merge mode. In the affine inter mode, the CPMV0 and the CPMV1 may be clearly determined by signaling two motion vector difference (MVD) information for the CPMV0 and the CPMV1. Meanwhile, in the affine merge mode, a CPMV pair may be derived without MVD information signaling.

In other words, in the affine merge mode, the CPMV of the current block may be derived using the CPMV of the neighboring block coded in the affine mode, and in the case of determining the motion vector in units of sub-blocks, the affine merge mode may be referred to as a sub-block merge mode.

In the affine merge mode, the encoding apparatus may signal, to the decoding apparatus, an index of a neighboring block coded in the affine mode for deriving the CPMV of the current block and may further signal a difference value between the CPMV of the neighboring block and the CPMV of the current block. Here, in the affine merge mode, an affine merge candidate list may be constructed based on a neighboring block, and an index of the neighboring block may represent a neighboring block to be referred to in order to derive the CPMV of the current block on the affine merge candidate list. The affine merge candidate list may be referred to as a sub-block merge candidate list.

The affine inter mode may be referred to as an affine MVP mode. In the affine MVP mode, the CPMV of the current block may be derived based on a control point motion vector predictor (CPMVP) and a control point motion vector difference (CPMVD). In other words, the encoding apparatus may determine the CPMVP for the CPMV of the current block, derive a CPMVD which is a difference between the CPMV of the current block and the CPMVP, and signal information on the CPMVP and information on the CPMVD to the decoding apparatus. Here, the affine MVP mode may construct an affine MVP candidate list based on the neighboring block, and the information on the CPMVP may represent a neighboring block to be referred to in order to derive the CPMVP for the CPMV of the current block on the affine MVP candidate list. The affine MVP candidate list may be referred to as a control point motion vector predictor candidate list.

For example, in case an affine inter mode of a 6-parameter affine motion model is applied, the current block may be encoded as described below.

Figure 8:
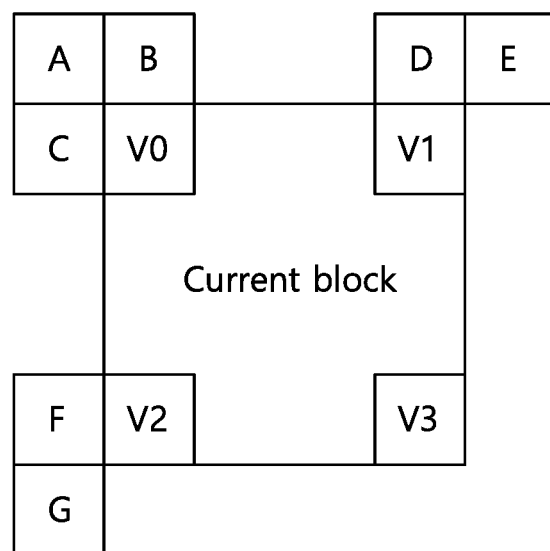
FIG. 8 is a diagram for describing a method for deriving a motion vector predictor at a control point according to an embodiment of the present disclosure.

FIG. 8 is a diagram for describing a method for deriving a motion vector predictor at a control point according to an embodiment of the present disclosure.

Referring to FIG. 8, a motion vector of CP0 of the current block may be expressed as $v_0$, a motion vector of CP1 may be expressed as $v_1$, a motion vector of a control point of a bottom-left sample position may be expressed as $v_2$, and a motion vector of CP2 may be expressed as $v_3$. More specifically, $v_0$ may denote a CPMVP of CP0, $v_1$ may denote a CPMVP of CP1, and $v_2$ may denote a CPMVP of CP2.

An affine MVP candidate may be a combination of a CPMVP candidate of CP0, a CPMVP candidate of CP1, and a CPMVP candidate of CP2.

For example, the affine MVP candidate may be derived as described below.

More specifically, a maximum of 12 CPMVP candidate combinations may be determined according to the equation shown below.

$$\{(v_0, v_1, v_2) | v_0 = \{v_A, v_B, v_C\}, v_1 = \{v_D, v_E\}, v_2 = \{v_F, v_G\}\} \quad \text{[Equation 6]}$$

Herein, $v_A$ may denote a motion vector of neighboring block A, $v_B$ may denote a motion vector of neighboring block B, $v_C$ may denote a motion vector of neighboring block C, $v_D$ may denote a motion vector of neighboring block D, $v_E$ may denote a motion vector of neighboring block E, $v_F$ may denote a motion vector of neighboring block F, and $v_G$ may denote a motion vector of neighboring block G.

Additionally, the neighboring block A may represent a neighboring block positioned at the top-left of a top-left sample position of the current block, the neighboring block B may represent a neighboring block positioned at the top of the top-left sample position of the current block, and the neighboring block C may represent a neighboring block positioned at a left-side of the top-left sample position of the current block. Additionally, the neighboring block D may represent a neighboring block positioned at the top of a top-right sample position of the current block, and the neighboring block E may represent a neighboring block positioned at the top-right of the top-right sample position of the current block. And, the neighboring block F may represent a neighboring block positioned at a left-side of a bottom-left sample position of the current block, and the neighboring block G may represent a neighboring block positioned at the bottom-left of the bottom-left sample position of the current block.

More specifically, referring to the above-described Equation 6, the CPMVP candidate of CP0 may include motion vector $v_A$ of the neighboring block A, motion vector $v_B$ of the neighboring block B, and/or motion vector $v_C$ of the neighboring block C, the CPMVP candidate of CP1 may include motion vector $v_D$ of the neighboring block D, and/or motion vector $v_E$ of the neighboring block E, and the CPMVP candidate of CP2 may include motion vector $v_F$ of the neighboring block F, and/or motion vector $v_G$ of the neighboring block G.

In other words, CPMVP $v_0$ of the CP0 may be derived based on a motion vector of at least one of neighboring blocks A, B, and C of the top-left sample position. Herein, neighboring block A may represent a block being positioned at a top-left of a top-left sample position of the current block, neighboring block B may represent a block being positioned at a top of the top-left sample position of the current block, and neighboring block C may represent a block being positioned at a left-side of the top-left sample position of the current block.

A combination of a maximum of 12 CPMVP candidates including CPMVP candidates of the CP0, CPMVP candidates of the CP1, and CPMVP candidates of the CP2 may be derived based on the motion vectors of the neighboring blocks.

Thereafter, the derived combination of CPMVP candidates may be aligned by order of candidates having lower DV values. Thus, the top 2 CPMVP candidate combinations may be derived as the affine MVP candidates.

The DV of a CPMVP candidate combination may be derived by using the following equation.

$$DV = |(v_{1x} - v_{0x})*h - (v_{2y} - v_{0y})*w| + |(v_{1y} - v_{0y})*h + (v2_x - v0_x)*w| \quad \text{[Equation 7]}$$

Thereafter, the encoding apparatus may determine CPMVs for each of the affine MVP candidates. Then, by comparing Rate Distortion (RD) costs for the CPMVs, affine MVP candidates having the lower RD costs may be selected as the optimal affine MVP candidates for the current block. The encoding apparatus may encode and signal indexes indicating the optimal candidates and CPMVDs.

Additionally, for example, in case the affine merge mode is applied, the current block may be encoded as described below.

Figure 9:
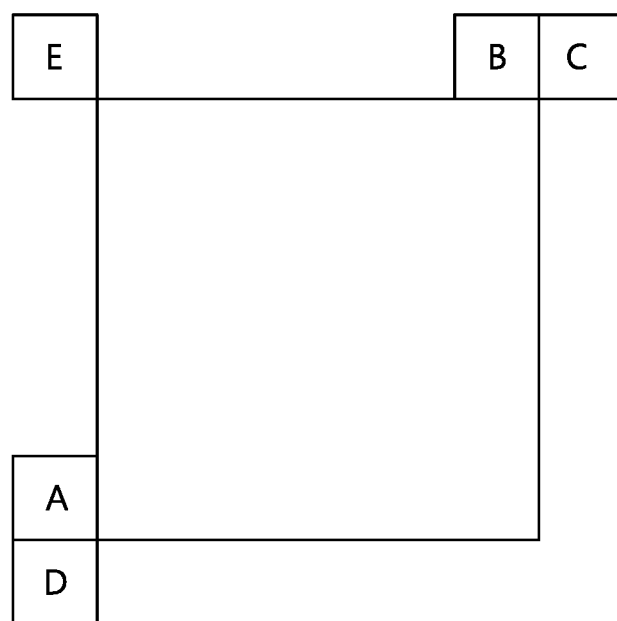
FIG. 9 is a diagram for describing a method for deriving a motion vector predictor at a control point according to an embodiment of the present disclosure.

FIG. 9 is a diagram for describing a method for deriving a motion vector predictor at a control point according to an embodiment of the present disclosure.

An affine merge candidate list of the current block may be constructed based on neighboring blocks of the current block shown in FIG. 9. The neighboring blocks may include neighboring block A, neighboring block B, neighboring block C, neighboring block D, and neighboring block E. And, the neighboring block A may denote a left neighboring block of the current block, the neighboring block B may denote a top neighboring block of the current block, the neighboring block C may denote a top-right corner neighboring block of the current block, the neighboring block D may denote a bottom-left corner neighboring block of the current block, and the neighboring block E may denote a top-left corner neighboring block of the current block.

For example, in case the size of the current block is W×H, and, in case, the x component of the top-left sample position of the current block is 0 and the y component is 0, the left neighboring block may be a block including a sample of coordinates (−1, H−1), the top neighboring block may be a block including a sample of coordinates (W−1, −1), the top-right corner neighboring block may be a block including a sample of coordinates (W, −1), the bottom-left corner neighboring block may be a block including a sample of coordinates (−1, H), and the top-left corner neighboring block may be a block including a sample of coordinates (−1, −1).

More specifically, for example, an encoding apparatus may scan neighboring block A, neighboring block B, neighboring block C, neighboring block D, and neighboring block E of the current block by a specific scanning order, and, in the scanning order, the neighboring block being the first to be encoded to the affine prediction mode may be determined as a candidate block of the affine merge mode, i.e., an affine merge candidate. Herein, for example, the specific scanning order ay be an alphabetical order. More specifically, the specific scanning order may be neighboring block A, neighboring block B, neighboring block C, neighboring block D, and neighboring block E.

Thereafter, the encoding apparatus may determine an affine motion model of the current block by using the determined candidate block, determine a CPMV of the current block based on the affine motion model, and determine an affine MVF of the current block based on the CPMV.

For example, in case neighboring block A is determined as the candidate block of the current block, neighboring block A may be coded as described below.

Figure 10:
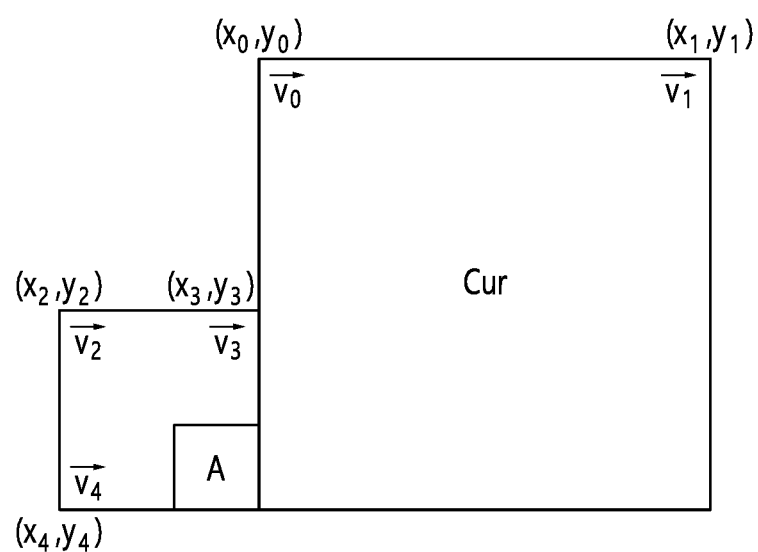
FIG. 10 illustrates an example of affine prediction being performed in a case where neighboring block A is selected as an affine merge candidate.

FIG. 10 illustrates an example of affine prediction being performed in a case where neighboring block A is selected as an affine merge candidate.

Referring to FIG. 10, an encoding apparatus may determine neighboring block A of the current block as a candidate block, and the encoding apparatus may derive an affine motion model of the current block based on CPMV, $v_2$, and $v_3$ of the neighboring block. Thereafter, the encoding apparatus may determine CPMV, $v_0$, and $v_1$ of the current block based on the affine motion model. The encoding apparatus may determine an affine MVF based on the CPMV, $v_0$, and $v_1$ of the current block and may perform an encoding process for the current block based on the affine MVF.

Meanwhile, in relation with affine inter prediction, inherited affined candidates are being considered for the construction of the affine MVP candidate list.

Herein, the inherited affine candidates may be as described below.

For example, in case a neighboring block of the current block is an affine block, and in case a reference picture of the current block and a reference picture of the neighboring block are the same, an affine MVP pair of the current block may be determined from the affine motion model of the neighboring block. Herein, the affine block may represent a block to which the affine inter prediction is applied. The inherited affine candidates may denote CPMVPs (e.g., the affine MVP pair) derived based on the affine motion model of the neighboring block.

More specifically, for example, the inherited affined candidates may be derived as described below.

Figure 11:
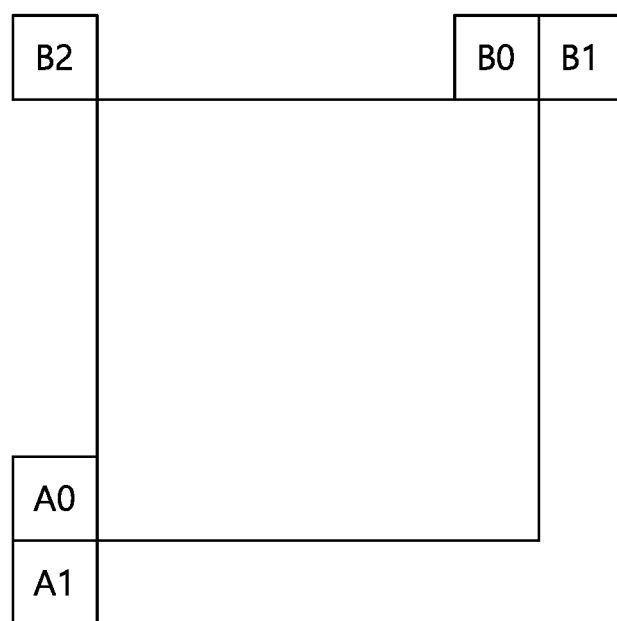
FIG. 11 illustrates exemplary neighboring blocks for deriving inherited affine candidates.

FIG. 11 illustrates exemplary neighboring blocks for deriving the inherited affine candidates.

Referring to FIG. 11, the neighboring blocks of the current block may include a left neighboring block A0 of the current block, a bottom-left corner neighboring block A1 of the current block, a top neighboring block B0 of the current block, a top-right corner neighboring block B1 of the current block, and a top-left corner neighboring block B2 of the current block.

For example, in case the size of the current block is W×H, and, in case, the x component of the top-left sample position of the current block is 0 and the y component is 0, the left neighboring block may be a block including a sample of coordinates (−1, H−1), the top neighboring block may be a block including a sample of coordinates (W−1, −1), the top-right corner neighboring block may be a block including a sample of coordinates (W, −1), the bottom-left corner neighboring block may be a block including a sample of coordinates (−1, H), and the top-left corner neighboring block may be a block including a sample of coordinates (−1, −1).

An encoding apparatus/decoding apparatus may sequentially check neighboring blocks A0, A1, B0, B1, and B2. And, in case a neighboring block is coded by using an affine motion model, and, in case a reference picture of the current block and a reference picture of the neighboring block are the same, 2 CPMVs or 3 CPMVs of the current block may be derived based on the affine motion model of the neighboring block. The CPMVs may be derived as affine MVP candidates of the current block. The affine MVP candidates may represent the inherited affine candidates.

For example, a maximum of two inherited affine candidates may be derived based on the neighboring blocks.

For example, the encoding apparatus/decoding apparatus may derive a first affine MVP candidate based on a first block within the neighboring blocks. Herein, the first block may be coded by using an affine motion model, and a reference picture of the first block and a reference picture of the current block may be the same. More specifically, when checking the neighboring blocks by a specific order, the first block may be a first block that is verified to be satisfying the conditions. The conditions may be that coding is performed by using the affine motion model, and that a reference picture of the block is the same as the reference picture of the current block.

Thereafter, the encoding apparatus/decoding apparatus may derive a second affine MVP candidate based on a second block within the neighboring blocks. Herein, the second block may be coded by using an affine motion model, and a reference picture of the second block and a reference picture of the current block may be the same. More specifically, when checking the neighboring blocks by a specific order, the second block may be a second block that is verified to be satisfying the conditions. The conditions may be that coding is performed by using the affine motion model, and that a reference picture of the block is the same as the reference picture of the current block.

Alternatively, for example, a maximum of one inherited affine candidate may be derived based on the neighboring blocks.

For example, the encoding apparatus/decoding apparatus may derive a first affine MVP candidate based on a first block within the neighboring blocks. Herein, the first block may be coded by using an affine motion model, and a reference picture of the first block and a reference picture of the current block may be the same. More specifically, when checking the neighboring blocks by a specific order, the first block may be a first block that is verified to be satisfying the conditions. The conditions may be that coding is performed by using the affine motion model, and that a reference picture of the block is the same as the reference picture of the current block.

A source code for an MVP candidate derivation of the current block may be derived as shown below in the following table.

TABLE 1

```
addAffineMVPCandUnscaled(pu, eRefPicList, refIdx, posLB, MD_LEFT, affiAMVPInfo);
if (affiAMVPInfo.numCand < 2)
    addAffineMVPCandUnscaled(pu eRefPicList, refIdx, posRT, MD_ABOVE, affiAMVPInfo);
if (affiAMVPInfo.numCand < 2)
    addAffineMVPCandUnscaled(pu, eRefPicList, refIdx, posRT, MD_ABOVE_RIGHT affiAMVPInfo);
if (affiAMVPInfo.numCand < 2)
    addAffineMVPCandUnscaled(pu, eRefPicList, refIdx, posLB, MD_BELOW_LEFT, affiAMVPInfo);
if (affiAMVPInfo.numCand < 2)
    addAffineMVPCandUnscaled(pu, eRefPicList, refIdx, posLT, MD_ABOVE_LEFT, affiAMVPInfo);
```

Referring to Table 1, the encoding apparatus/decoding apparatus may determine whether or not the left neighboring block is coded by using the affine motion model, and may also determine whether or not a reference picture of the current block and a reference picture of the left neighboring block are the same. In case the above-described conditions are satisfied, CPMVs that are derived based on the affine motion model of the left neighboring block may be derived as CPMVP candidates of the current block.

Thereafter, the encoding apparatus/decoding apparatus may determine whether a number of the derived CPMVP candidates is less than 2. In case the number of derived CPMVP candidates is not less than 2, the CPMVP candidate derivation process may be ended.

Additionally, in case the number of derived CPMVP candidates is less than 2, it may be determined whether or not the top neighboring block is coded by using the affine motion model and whether or not a reference picture of the current block and a reference picture of the top neighboring block are the same. And, in case the above-described conditions are satisfied, CPMVs that are derived based on the affine motion model of the top neighboring block may be derived as CPMVP candidates of the current block.

Thereafter, the encoding apparatus/decoding apparatus may determine whether a number of the derived CPMVP candidates is less than 2. In case the number of derived CPMVP candidates is not less than 2, the CPMVP candidate derivation process may be ended.

Additionally, in case the number of derived CPMVP candidates is less than 2, it may be determined whether or not the top-right corner neighboring block is coded by using the affine motion model and whether or not a reference picture of the current block and a reference picture of the top-right corner neighboring block are the same. And, in case the above-described conditions are satisfied, CPMVs that are derived based on the affine motion model of the top-right corner neighboring block may be derived as CPMVP candidates of the current block.

Thereafter, the encoding apparatus/decoding apparatus may determine whether a number of the derived CPMVP candidates is less than 2. In case the number of derived CPMVP candidates is not less than 2, the CPMVP candidate derivation process may be ended.

Additionally, in case the number of derived CPMVP candidates is less than 2, it may be determined whether or not the bottom-left corner neighboring block is coded by using the affine motion model and whether or not a reference picture of the current block and a reference picture of the bottom-left corner neighboring block are the same. And, in case the above-described conditions are satisfied, CPMVs that are derived based on the affine motion model of the bottom-left corner neighboring block may be derived as CPMVP candidates of the current block.

Thereafter, the encoding apparatus/decoding apparatus may determine whether a number of the derived CPMVP candidates is less than 2. In case the number of derived CPMVP candidates is not less than 2, the CPMVP candidate derivation process may be ended.

Additionally, in case the number of derived CPMVP candidates is less than 2, it may be determined whether or not the top-left corner neighboring block is coded by using the affine motion model and whether or not a reference picture of the current block and a reference picture of the top-left corner neighboring block are the same. And, in case the above-described conditions are satisfied, CPMVs that are derived based on the affine motion model of the top-left corner neighboring block may be derived as CPMVP candidates of the current block.

Additionally, as another example, the inherited affine candidate may be derived as described below.

For example, the encoding apparatus/decoding apparatus may sequentially check the neighboring blocks by a specific order. And, in case a neighboring block is coded by using an affine motion model, and, in case a reference picture of the current block and a reference picture of the neighboring block are the same, an inherited affine candidate that does not apply scaling based on the neighboring block may be derived. And, in case the neighboring block is coded by using an affine motion model, and, in case a reference picture of the current block and a reference picture of the neighboring block are not the same, an inherited affine candidate applying scaling based on the neighboring block may be derived.

More specifically, in case the neighboring block is coded by using an affine motion model, and, in case a reference picture of the current block and a reference picture of the neighboring block are the same, as described above in the previous embodiment, the encoding apparatus/decoding apparatus may derive the affine MVP candidate of the current block based on the affine motion model of the neighboring block.

Additionally, in case the neighboring block is coded by using an affine motion model, and, in case a reference picture of the current block and a reference picture of the neighboring block are not the same, the encoding apparatus/decoding apparatus may derive motion vectors for CPs of the current block based on the affine motion model of the neighboring block, may scale the motion vectors by using a scaling factor, and may derive the scaled motion vectors as the affine MVP candidates. Herein, the scaling factor may be a distance ratio of a first time distance and a second time distance. More specifically, the scaling factor may be a value obtained by dividing the first time distance by the second time distance. The first time distance may be a difference between a Picture Order Count (POC) of a current picture including the current block and a POC of a reference picture of the current block. And, the second time distance may be a difference between a POC of the current picture and a POC of a reference picture of the neighboring block.

A source code for the above-described MVP candidate derivation of the current block may be derived as shown below in the following table.

TABLE 2

```
Bool isScaledFlagl X = false:
const PredictionUnit* tmpPU = cs.getPURestricted(  posl B. offset( -1, 1 ), pu, pu.chType );
isScaledFlagl X = tmpPU != NUI I && CU::isInter( *tmpPU->cu ) && tmpPU->cu->affine;
if ( !isScaledFlagLX )
{
  tmpPU = cs.getPURestricted( posLB.offset( -1, 0 ), pu, pu.chType );
  isScaledFlagLX = tmpPU   != NULL && CU::isInter( *tmpPU->cu ) && tmpPU->cu->affine;
}
// Left predictor search
if (   isScaledFlagLX )
{
```

TABLE 2-continued

```
    Bool bAdded = addAffineMVPCandUnscaled( pu, eRefPicList, refIdx, posLB, MD_BELOW_LEFT, affiAMVPInfo
);
    if ( !bAdded )
    {
        bAdded = addAffineMVPCandUnscaled( pu, eRefPicList, refIdx, posLB, MD_LEFT, affiAMVPInfo );
        if ( !bAdded )
        {
            bAdded = addAffineMVPCandWithScaling( pu, eRefPicList, refIdx, posLB, MD_BELOW_LEFT,
affiAMPInfo );
            if ( !bAdded )
            {
                addAffineMVPCandWithScaling( pu, eRefPicList, refIdx, posLB, MD_LEFT, affiAMVPInfo );
            }
        }
    }
}
// Above predictor search
{
    Bool bAdded = addAffineMVPCandUnscaled( pu, eRefPicList, refIdx, posRT, MD_ABOVE_RIGHT, affiAMVPInfo
);
    if ( !bAdded )
    {
        bAdded = addAffineMVPCandUnscaled( pu, eRefPicList, refIdx, posRT, MD_ABOVE, affiAMVPInfo );
        if ( !bAdded )
        {
            addAffineMVPCandUnscaled( pu, eRefPicList, refIdx, posLT, MD_ABOVE_LEFT, affiAMVPInfo );
        }
    }
}
if ( !isScaledFlagLX )
{
    Bool bAdded = addAffineMVPCandWithScaling( pu, eRefPicList, refIdx, posBT, MD_ABOVE_RIGHT,
affiAMVPInfo );
    if ( !bAdded )
    {
        bAdded = addAffineMVPCandWithScaling( pu, eRefPicList, refIdx, posRT, MD_ABOVE, affiAMVPInfo );
        if ( bAdded )
        {
            addAffineMVPCandWithScaling( pu, eRefPicList, refIdx, posLT, MD_ABOVE_LEFT, affiAMVPInfo );
        }
    }
}
```

The performance and encoding/decoding time of the above-described embodiments are very similar. And, therefore, after performing a complexity analysis, the embodiment having the lower complexity level may be selected.

The complexity analysis for the embodiments may be derived as shown below in the following table.

TABLE 3

Number of operations for 4-parameter candidates pruning 4 comp.
Number of operations for 6-parameter candidates pruning 6 comp.
Number of operations in inheriting 4-parameter neighbor 10 shift + 10 add
(2 shift + 2 add for deriving parameters, (4 shift + 4 add) * 2 for deriving CPMVPs)
Number of operations in inheriting 6-parameter neighbor 16 shift + 16 add
(4 shift + 4 add for deriving parameters, (4 shift + 4 add) * 3 for deriving CPMVPs)

Inherited affine AMVP candidates

| | Scaled version of motion vector (Y/N) | Max number of potential candidate positions | Max number of potential inherited candidates | How to inherit neighbor motion model | Summary |
|---|---|---|---|---|---|
| method 1 (4-parameter) | N | 5 pos. | 10 cand.: 5 cand. in list0 and 5 cand. in list1 | | non-scaled 5 pos. 10 cand. 36 comp. 100 shift. 100 add. |
| method 1 (6-parameter) | N | 5 pos. | 10 cand.: 5 cand. in list0 and 5 cand. in list1 | No distinguish in 4/6 parameter model Always use LT, RT, LR control points of neighbor affine coded blcok to calculte 2 or 3 CPMVPs of current block by 6 parameter motion model LB CPMV of 4 parameter affine block should be calculated to generate pseudo 6-parameter model | non-scaled 5 pos. 10 cand. 54 comp. 160 shift. 160 add. |

TABLE 3-continued

Number of operations for 4-parameter candidates pruning 4 comp.
Number of operations for 6-parameter candidates pruning 6 comp.
Number of operations in inheriting 4-parameter neighbor 10 shift + 10 add
(2 shift + 2 add for deriving parameters, (4 shift + 4 add) * 2 for deriving CPMVPs)
Number of operations in inheriting 6-parameter neighbor 16 shift + 16 add
(4 shift + 4 add for deriving parameters, (4 shift + 4 add) * 3 for deriving CPMVPs)

Inherited affine AMVP candidates

| | Scaled version of motion vector (Y/N) | Max number of potential candidate positions | Max number of potential inherited candidates | How to inherit neighbor motion model | Summary |
|---|---|---|---|---|---|
| method 2 (4-parameter) | Y | 5 pos. | 2 cand.: left predictor and above predictor | | scaled 5 pos. 2 cand. 4 comp. 20 shfit. 20 add. |
| method 2 (6-parameter) | Y | 5 pos. | 2 cand.: left predictor and above predictor | No distinguish in 4/6 parameter model Always use LT, RT, LB contorl points of neighbor affine coded blcok to calculte 2 or 3 CPMVPs of current block by 6 parameter motion model LB CPMV of 4 parameter affine block should be calculated to generate pseudo 6-parameter model | scaled 5 pos. 2 cand. 6 comp. 32 shfit. 32 add. |

Referring to Table 3, unlike the second embodiment, which considers both scaled affine MVP candidates and non-scaled affine MVP candidates, the first embodiment, which considers only non-scaled affine MVP candidates, may be excellent in the aspect of having smaller numbers comp, shift, and add.

Meanwhile, the present disclosure proposes a method having similar performance and encoding/decoding times as the above-described embodiments while having specifically lower complexity.

For example, a left predictor and an above predictor are divided, and the left predictor may be derived based on an affine coded block having the same reference picture as the current block, which is first derived by scanning a left neighboring block and a bottom-left corner neighboring block by a specific order, and the above predictor may be derived based on an affine coded block having the same reference picture as the current block, which is first derived by scanning a top-right corner neighboring block, a top neighboring block, and a top-left corner neighboring block by a specific order.

More specifically, the encoding apparatus/decoding apparatus may derive a first affine MVP candidate of the current block from a left block group including a left neighboring block and a bottom-left corner neighboring block, and the encoding apparatus/decoding apparatus may derive a second affine MVP candidate of the current block from a top block group including a top-right corner neighboring block, a top neighboring block, and a top-left corner neighboring block.

Herein, the first affine MVP candidate may be derived based on a first block within the left block group, the first block may be coded by using an affine motion model, and a reference picture of the first block and a reference picture of the current block may be the same. More specifically, the first block may be a first block that is verified to be satisfying the conditions, when checking neighboring blocks within the left block group by a specific order. The conditions may be that coding is performed by using an affine motion model, and that a reference picture of a block is the same as a reference picture of the current block.

Additionally, the second affine MVP candidate may be derived based on a second block within the top block group, the second block may be coded by using an affine motion model, and a reference picture of the second block and a reference picture of the current block may be the same. More specifically, the second block may be a first block that is verified to be satisfying the conditions, when checking neighboring blocks within the top block group by a specific order. The conditions may be that coding is performed by using an affine motion model, and that a reference picture of a block is the same as a reference picture of the current block.

Additionally, for example, an order for scanning the left neighboring block and the bottom-left corner neighboring block may be an order of left neighboring block and bottom-left corner neighboring block. And, an order for scanning the top-right corner neighboring block, the top neighboring block, and the top-left corner neighboring block may be an order of top-right corner neighboring block, top neighboring block, and top-left corner neighboring block. Additionally, other than the above-described example, another example of an order for scanning the above-described neighboring block may be used.

A source code for the above-described affine MVP candidate derivation of the current block may be derived as shown below in the following table.

TABLE 4

```
// Left predictor search
{
  Bool bAdded = addAffineMVPCandUnscaled( pu, eRefPicList, refIdx, posLB, MD_BELOW_LEFT, affiAMVPInfo );
  if ( !bAdded )
  {
    bAdded = addAffineMVPCandUnscaled( pu, eRefPicList, refIdx, posLB, MD_LEFT, affiAMVPInfo );
  }
}
```

TABLE 4-continued

```
// Above predictor search
{
    Bool bAdded = addAffineMVPCandUnscaled( pu, eRefPicList, refIdx, posRT, MD_ABOVE_RIGHT, affiAMVPInfo );
    if ( !bAdded )
    {
        bAdded = addAffineMVPCandUnscaled( pu, eRefPicList, refIdx, posRT, MD_ABOVE, affiAMVPInfo );
        if ( !bAdded )
        {
            addAffineMVPCandUnscaled( pu, eRefPicList, refIdx, posLT, MD_ABOVE_LEFT, affiAMVPInfo );
        }
    }
}
```

Additionally, the complexity analysis for the affine MVP candidate derivation method proposed in the present disclosure may be derived as shown below in the following table.

TABLE 5

Number of operations for 4-parameter candidates pruning 4 comp.
Number of operations for 6-parameter candidates pruning 6 comp.
Number of operations in inheriting 4-parameter neighbor 10 shift + 10 add
(2 shift + 2 add for deriving parameters, (4 shift + 4 add) * 2 for deriving CPMVPs)
Number of operations in inheriting 6-parameter neighbor 16 shift + 16 add
(4 shift + 4 add for deriving parameters, (4 shift + 4 add) * 3 for deriving CPMVPs)

| | Inherited affine AMVP candidates | | | |
|---|---|---|---|---|
| | Scaled version of motion vector (Y/N) | Max number of potential candidate positions | Max number of potential inherited candidates | How to inherit neighbor motion model | Summary |
| Proposed Method (4-parameter) | Y | 5 pos. | 2 cand.: left predictor and above predictor | | non-scaled 5 pos. 2 cand. 4 comp. 20 shfit. 20 add. |
| Proposed Method (6-parameter) | Y | 5 pos. | 2 cand.: left predictor and above predictor | | non-scaled 5 pos. 2 cand. 6 comp. 32 shfit. 32 add. |

Referring to Table 5, the proposed affine MVP candidate derivation method is performed by considering the smallest numbers of pos, cand, comp, shift, and add as compared to the existing (or old) embodiments, and by considering only the non-scaled affine MVP candidates. Accordingly, in comparison with the above-mentioned embodiments, the proposed method may have the lowest complexity. Therefore, since the affine MVP candidate derivation method proposed in the present disclosure is similar to the existing (or old) embodiments in light of performance and encoding/decoding times, while having the lowest complexity, it may be determined that the proposed method is more excellent than the existing embodiments.

Meanwhile, for example, in case the available number of inherited affined candidates is less than 2, a constructed affine candidate may be considered. The constructed affine candidate may be derived as described below.

Figure 12:
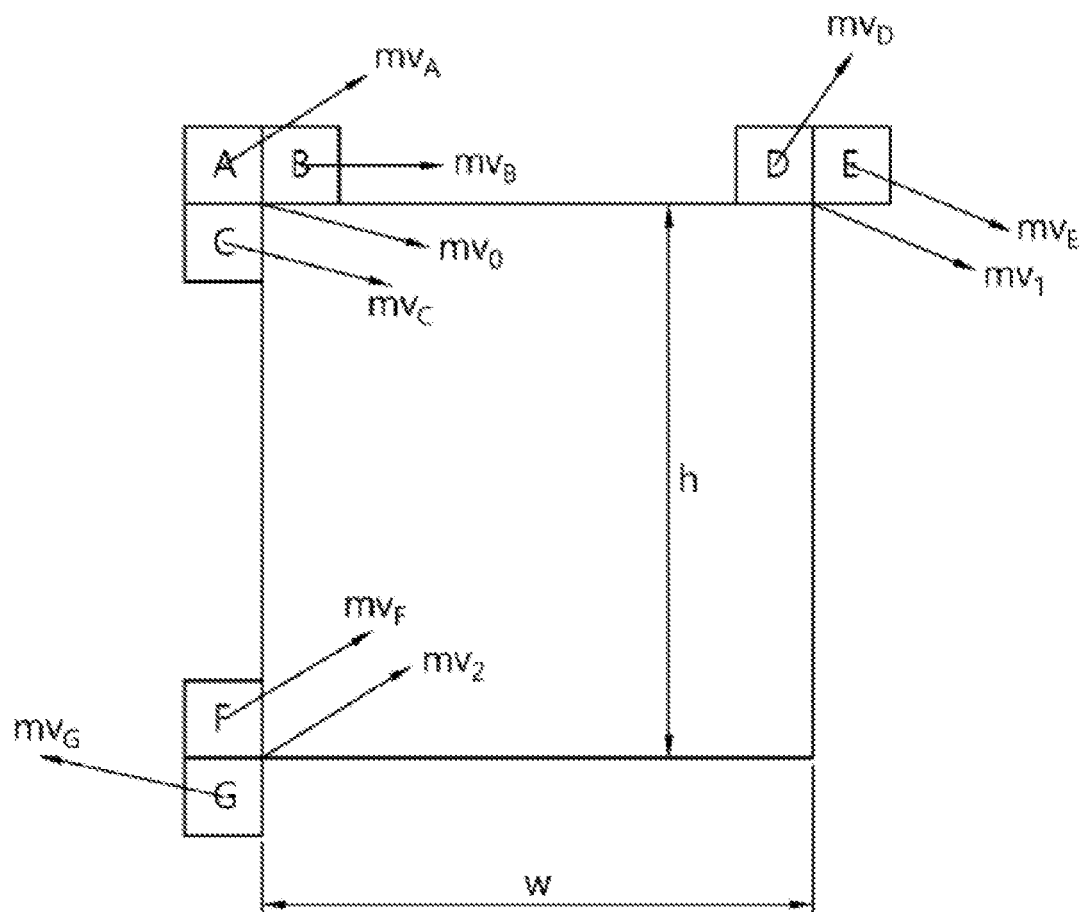
FIG. 12 illustrates exemplary spatial candidates for constructed affine candidate.

FIG. 12 illustrates exemplary spatial candidates for the constructed affine candidates As shown in FIG. 12, motion vectors of neighboring blocks of the current block may be divided into 3 groups. Referring to FIG. 12, the neighboring blocks may include neighboring block A, neighboring block B, neighboring block C, neighboring block D, neighboring block E, neighboring block F, and neighboring block G.

The neighboring block A may denote a neighboring block positioned at a top-left of a top-left sample position of the current block, the neighboring block B may denote a neighboring block positioned at a top of the top-left sample position of the current block, and the neighboring block C may denote a neighboring block positioned at a left-side of the top-left sample position of the current block. Additionally, the neighboring block D may denote a neighboring block positioned at a top of a top-right sample position of the current block, and the neighboring block E may denote a neighboring block positioned at a top-right of the top-right sample position of the current block. Additionally, the neighboring block F may denote a neighboring block positioned at a left side of a bottom-left sample position of the current block, and the neighboring block G may denote a neighboring block positioned at a bottom-left of the bottom-left sample position of the current block.

For example, the 3 groups may include $S_0$, $S_1$, and $S_2$, and the $S_0$, the $S_1$, and the $S_2$ may be derived as shown below in the following table.

TABLE 6

$S_0 = \{mv_A, mv_B, mv_C\}$  $S_1 = \{mv_D, mv_E\}$  $S_2 = \{mv_F, mv_G\}$

Herein, $mv_A$ may represent a motion vector of the neighboring block A, $mv_B$ may represent a motion vector of the neighboring block B, $mv_C$ may represent a motion vector of the neighboring block C, $mv_D$ may represent a motion vector of the neighboring block D, $mv_E$ may represent a motion vector of the neighboring block E, $mv_F$ may represent a motion vector of the neighboring block F, and $mv_G$ may represent a motion vector of the neighboring block G. The $S_0$ may denote a first group, the $S_1$ may denote a second group, and the $S_2$ may denote a third group.

The encoding apparatus/decoding apparatus may derive $mv_0$ from the $S_0$, $mv_1$ from the $S_1$, and $mv_2$ from the $S_2$, and the encoding apparatus/decoding apparatus may derive an affine MVP candidate including the $mv_0$, the $mv_1$, and the $mv_2$. The affine MVP candidate may represent the constructed affine candidate Additionally, the $mv_0$ may be a CPMVP candidate of CP0, the $mv_1$ may be a CPMVP candidate of CP1, and the $mv_2$ may be a CPMVP candidate of CP2.

Herein, a reference picture for the $mv_0$ may be the same as a reference picture of the current block. More specifically, when checking motion vectors within the $S_0$ according to a specific order, the $mv_0$ may be a first motion vector that is verified to be satisfying a condition. The condition may be that a reference picture for a motion vector is the same as a reference picture of the current block.

Additionally, a reference picture for the $mv_1$ may be the same as a reference picture of the current block. More specifically, when checking motion vectors within the $S_1$ according to a specific order, the $mv_1$ may be a first motion vector that is verified to be satisfying a condition. The condition may be that a reference picture for a motion vector is the same as a reference picture of the current block.

Additionally, a reference picture for the $mv_2$ may be the same as a reference picture of the current block. More specifically, when checking motion vectors within the $S_2$ according to a specific order, the $mv_2$ may be a first motion vector that is verified to be satisfying a condition. The condition may be that a reference picture for a motion vector is the same as a reference picture of the current block.

Meanwhile, in case only the $mv_0$ and the $mv_1$ are derived, the $mv_2$ may be derived by using the following equation.

$$\overline{mv}_2^x = \overline{mv}_0^x - h\frac{(\overline{mv}_1^y - \overline{mv}_0^y)}{w}, \overline{mv}_2^y = \overline{mv}_0^y + h\frac{(\overline{mv}_1^x - \overline{mv}_0^x)}{w} \quad \text{[Equation 8]}$$

Herein, $mv_2^x$ denotes an x component of the $mv_2$, $mv_2^y$ denotes a y component of the $mv_2$, $mv_0^x$ denotes an x component of the $mv_0$, $mv_0^y$ denotes a y component of the $mv_0$, $mv_1^x$ denotes an x component of the $mv_1$, and $mv_1^y$ denotes a y component of the $mv_1$. Additionally, w denotes a width of the current block, and h denotes a height of the current block.

Meanwhile, in case only the $mv_0$ and the $mv_2$ are derived, the $mv_1$ may be derived by using the following equation.

$$\overline{mv}_1^x = \overline{mv}_0^x + h\frac{(\overline{mv}_2^y - \overline{mv}_0^y)}{w}, \overline{mv}_1^y = \overline{mv}_0^y - h\frac{(\overline{mv}_2^x - \overline{mv}_0^x)}{w} \quad \text{[Equation 9]}$$

Herein, $mv_1^x$ denotes an x component of the $mv_1$, $mv_1^y$ denotes a y component of the $mv_1$, $mv_0^x$ denotes an x component of the $mv_0$, $mv_0^y$ denotes a y component of the $mv_0$, $mv_2^x$ denotes an x component of the $mv_2$, and $mv_2^y$ denotes a y component of the $mv_2$. Additionally, w denotes a width of the current block, and h denotes a height of the current block.

Additionally, in case the number of available inherited affine candidates and/or the number of available constructed affine candidates is less than 2, an AMVP process of the existing HEVC standard may be applied to the affine MVP list construction. More specifically, in case the number of available inherited affine candidates and/or the number of available constructed affine candidates is less than 2, a process of configuring MVP candidates of the existing HEVC standard may be performed.

Meanwhile, flow charts of the embodiments for constructing the above-described affine MVP list are as described below.

Figure 13:
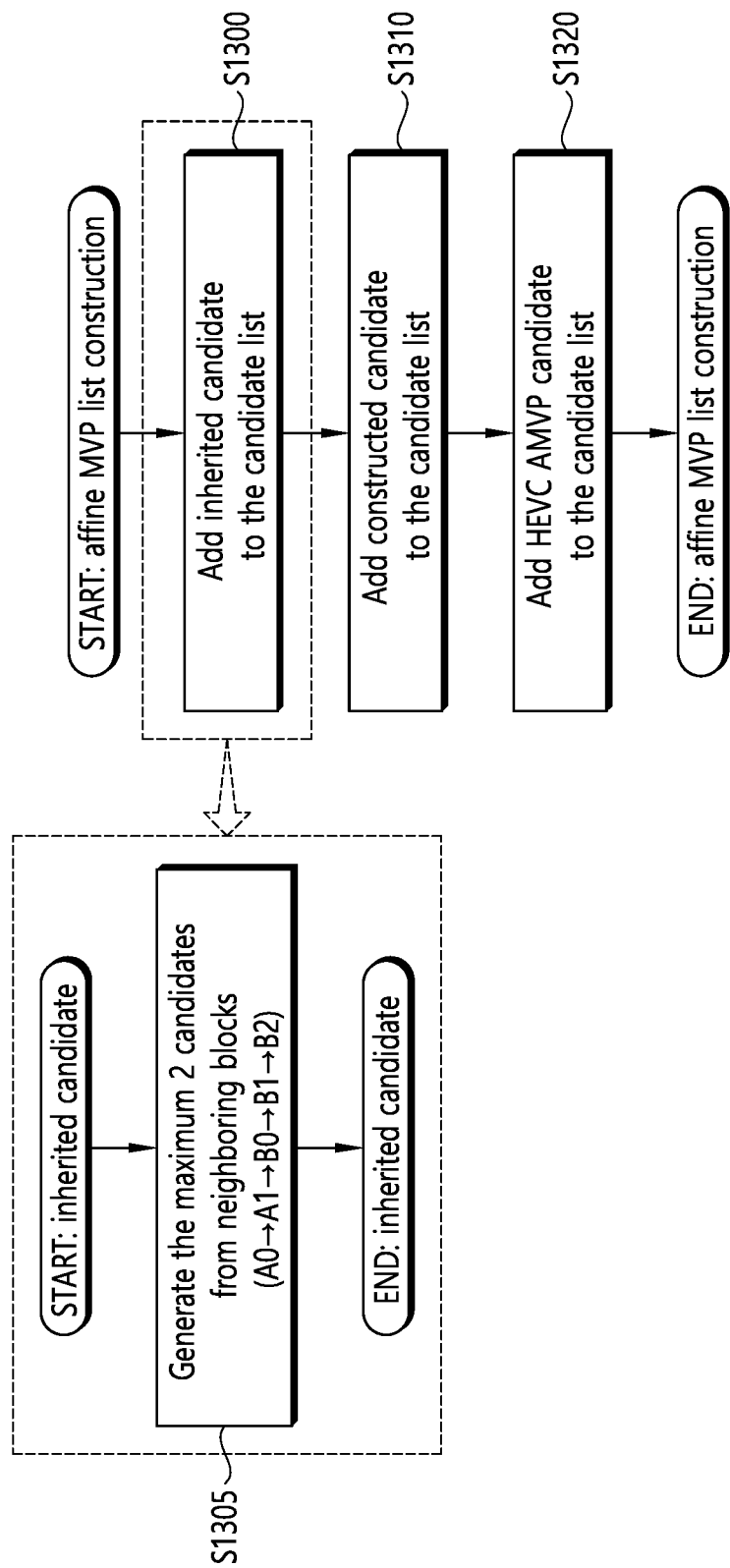
FIG. 13 illustrates an example for constructing an affine MVP list.

FIG. 13 illustrates an example for constructing an affine MVP list.

Referring to FIG. 13, an encoding apparatus/decoding apparatus may add an inherited candidate to an affine MVP list of a current block (S1300). The inherited candidate may represent the above-described inherited affine candidate.

More specifically, the encoding apparatus/decoding apparatus may derive a maximum of 2 inherited affine candidates from neighboring blocks of the current block (S1305). Herein, the neighboring blocks may include a left neighboring block A0 of the current block, a bottom-left corner neighboring block A1 of the current block, a top neighboring block B0 of the current block, a top-right corner neighboring block B1 of the current block, and a top-left corner neighboring block B2 of the current block.

For example, the encoding apparatus/decoding apparatus may derive a first affine MVP candidate based on a first block within the neighboring blocks. Herein, the first block may be coded by using an affine motion model, and a reference picture of the first block and a reference picture of the current block may be the same. More specifically, when checking the neighboring blocks by a specific order, the first block may be a first block that is verified to be satisfying the conditions. The conditions may be that coding is performed by using the affine motion model, and that a reference picture of the block is the same as the reference picture of the current block.

Thereafter, the encoding apparatus/decoding apparatus may derive a second affine MVP candidate based on a second block within the neighboring blocks. Herein, the second block may be coded by using an affine motion model, and a reference picture of the second block and a reference picture of the current block may be the same. More specifically, when checking the neighboring blocks by a specific order, the second block may be a second block that is verified to be satisfying the conditions. The conditions may be that coding is performed by using the affine motion model, and that a reference picture of the block is the same as the reference picture of the current block.

Meanwhile, the specific order may be left neighboring block A0→bottom-left corner neighboring block A1→top neighboring block B0→top-right corner neighboring block B1→top-left corner neighboring block B2. Additionally, the checking may be performed by an order other than the above-described order and may not be limited only to the above-described example.

The encoding apparatus/decoding apparatus may add a constructed candidate to an affine MVP list of the current block (S1310). The constructed candidate may represent the above-described constructed affine candidate. In case a number of available inherited candidates is less than 2, the encoding apparatus/decoding apparatus may add a constructed candidate to an affine MVP list of the current block.

The encoding apparatus/decoding apparatus may derive $mv_0$ from a first group, mv from a second group, and $mv_2$ from a third group, and the encoding apparatus/decoding apparatus may derive the constructed affine candidate including the $mv_0$, the $mv_1$, and the $mv_2$. The $mv_0$ may be a CPMVP candidate of CP0, the $mv_1$ may be a CPMVP candidate of CP1, and the $mv_2$ may be a CPMVP candidate of CP2.

Herein, a reference picture for the $mv_0$ may be the same as a reference picture of the current block. More specifically, when checking motion vectors within the first group according to a specific order, the $mv_0$ may be a first motion vector that is verified to be satisfying a condition. The condition may be that a reference picture for a motion vector is the same as a reference picture of the current block. Additionally, a reference picture for the $mv_1$ may be the same as a reference picture of the current block. More specifically, when checking motion vectors within the second group according to a specific order, the $mv_1$ may be a first motion vector that is verified to be satisfying a condition. The condition may be that a reference picture for a motion vector is the same as a reference picture of the current block. Additionally, a reference picture for the $mv_2$ may be the same as a reference picture of the current block. More specifically, when checking motion vectors within the third group according to a specific order, the $mv_2$ may be a first motion vector that is verified to be satisfying a condition. The condition may be that a reference picture for a motion vector is the same as a reference picture of the current block.

Additionally, the first group may include a motion vector of the neighboring block A, a motion vector of the neighboring block B, and a motion vector of the neighboring block C. The second group may include a motion vector of the neighboring block D and a motion vector of the neighboring block E. The third group may include a motion vector of the neighboring block F and a motion vector of the neighboring block G. The neighboring block A may denote a neighboring block positioned at a top-left of a top-left sample position of the current block, the neighboring block B may denote a neighboring block positioned at a top of the top-left sample position of the current block, and the neighboring block C may denote a neighboring block positioned at a left-side of the top-left sample position of the current block. Additionally, the neighboring block D may denote a neighboring block positioned at a top of a top-right sample position of the current block, and the neighboring block E may denote a neighboring block positioned at a top-right of the top-right sample position of the current block. Additionally, the neighboring block F may denote a neighboring block positioned at a left side of a bottom-left sample position of the current block, and the neighboring block G may denote a neighboring block positioned at a bottom-left of the bottom-left sample position of the current block.

The encoding apparatus/decoding apparatus may add an HEVC AMVP candidate to the affine MVP list of the current block (S1320). In case a number of available inherited candidates and/or constructed candidates is less than 2, the encoding apparatus/decoding apparatus may add an HEVC AMVP candidate to the affine MVP list of the current block. More specifically, in case the number of available inherited candidates and/or constructed candidates is less than 2, the encoding apparatus/decoding apparatus may perform a process of configuring MVP candidates of the existing HEVC standard.

Figure 14:
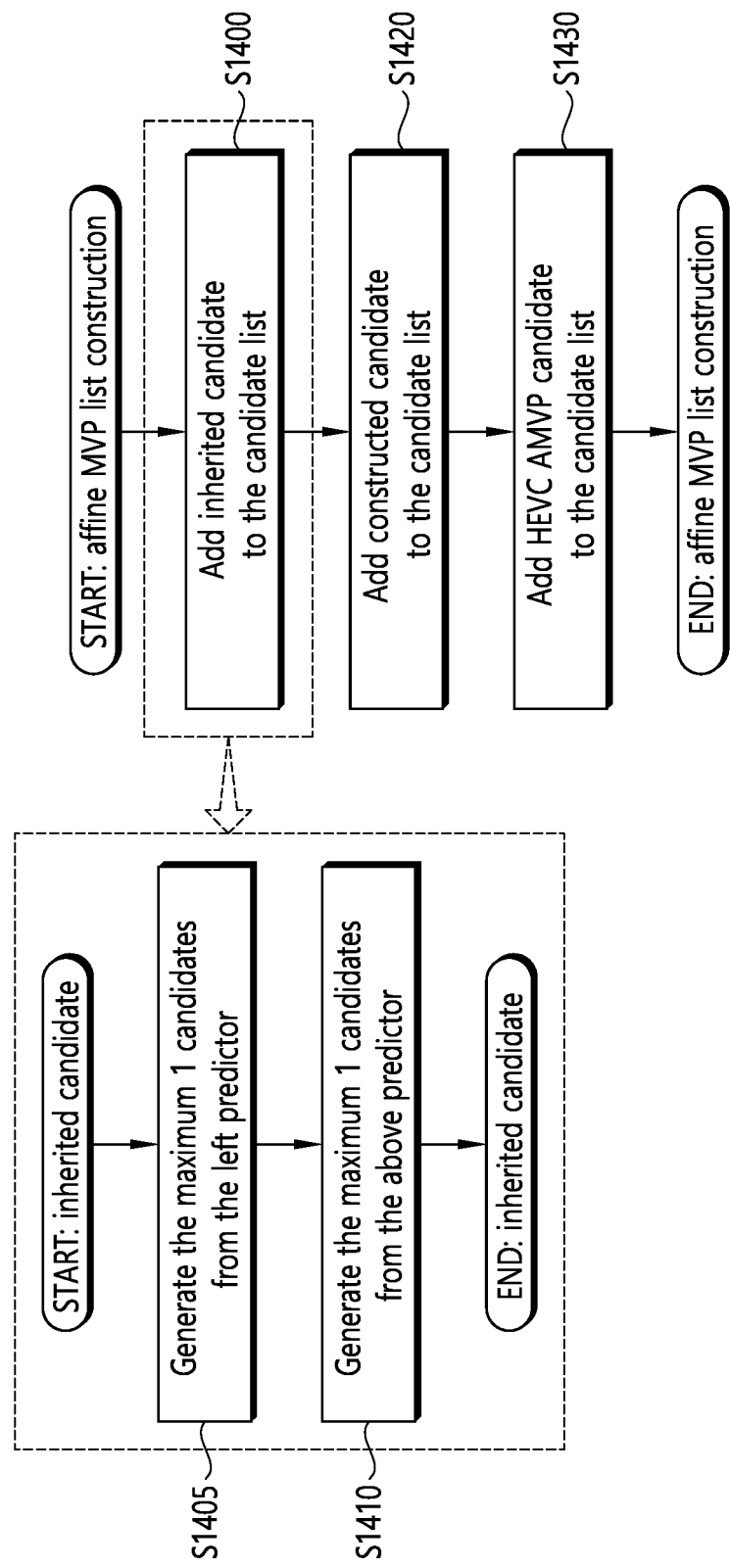
FIG. 14 illustrates an example for constructing an affine MVP list.

FIG. 14 illustrates an example for constructing an affine MVP list.

Referring to FIG. 14, an encoding apparatus/decoding apparatus may add an inherited candidate to an affine MVP list of a current block (S1400). The inherited candidate may represent the above-described inherited affine candidate.

More specifically, the encoding apparatus/decoding apparatus may derive a first affine MVP candidate of the current block from a left block group including a left neighboring block and a bottom-left corner neighboring block (S1405), and the encoding apparatus/decoding apparatus may derive a second affine MVP candidate of the current block from a top block group including a top-right corner neighboring block, a top neighboring block, and a top-left corner neighboring block (S1410).

Herein, the first affine MVP candidate may be derived based on a first block within the left block group, the first block may be coded by using an affine motion model, and a reference picture of the first block and a reference picture of the current block may be the same. More specifically, when checking the neighboring blocks by a specific order, the first block may be a first block that is verified to be satisfying the conditions. The conditions may be that coding is performed by using the affine motion model, and that a reference picture of the block is the same as the reference picture of the current block.

Additionally, the second affine MVP candidate may be derived based on a second block within the top block group, the second block may be coded by using an affine motion model, and a reference picture of the second block and a reference picture of the current block may be the same. More specifically, when checking the neighboring blocks by a specific order, the second block may be a second block that is verified to be satisfying the conditions. The conditions may be that coding is performed by using the affine motion model, and that a reference picture of the block is the same as the reference picture of the current block.

Meanwhile, the specific order for checking the left block group may be an order of left neighboring block and bottom-left corner neighboring block. Alternatively, the specific order for checking the left block group may be an order of bottom-left corner neighboring block and left neighboring block. Additionally, the specific order for checking the top block group may be an order of top-right corner neighboring block, top neighboring block, and top-left corner neighboring block. Alternatively, the specific order for checking the top block group may be an order of top neighboring block, top-right corner neighboring block, and top-left corner neighboring block. Additionally, the checking may be performed by an order other than the above-described order and may not be limited only to the above-described example.

The encoding apparatus/decoding apparatus may add a constructed candidate to an affine MVP list of the current block (S1420). The constructed candidate may represent the above-described constructed affine candidate. In case a number of available inherited candidates is less than 2, the encoding apparatus/decoding apparatus may add a constructed candidate to an affine MVP list of the current block.

The encoding apparatus/decoding apparatus may derive $mv_0$ from a first group, mv from a second group, and $mv_2$ from a third group, and the encoding apparatus/decoding apparatus may derive the constructed affine candidate including the $mv_0$, the $mv_1$, and the $mv_2$. The $mv_0$ may be a CPMVP candidate of CP0, the $mv_1$ may be a CPMVP candidate of CP1, and the $mv_2$ may be a CPMVP candidate of CP2.

Herein, a reference picture for the $mv_0$ may be the same as a reference picture of the current block. More specifically, when checking motion vectors within the first group according to a specific order, the $mv_0$ may be a first motion vector that is verified to be satisfying a condition. The condition may be that a reference picture for a motion vector is the same as a reference picture of the current block. Additionally, a reference picture for the $mv_1$ may be the same as a reference picture of the current block. More specifically, when checking motion vectors within the second group according to a specific order, the $mv_1$ may be a first motion vector that is verified to be satisfying a condition. The condition may be that a reference picture for a motion vector is the same as a reference picture of the current block. Additionally, a reference picture for the $mv_2$ may be the same as a reference picture of the current block. More specifically, when checking motion vectors within the third group according to a specific order, the $mv_2$ may be a first motion vector that is verified to be satisfying a condition. The condition may be that a reference picture for a motion vector is the same as a reference picture of the current block.

Additionally, the first group may include a motion vector of the neighboring block A, a motion vector of the neighboring block B, and a motion vector of the neighboring block C. The second group may include a motion vector of the neighboring block D and a motion vector of the neighboring block E. The third group may include a motion vector of the neighboring block F and a motion vector of the neighboring block G. The neighboring block A may denote a neighboring block positioned at a top-left of a top-left sample position of the current block, the neighboring block B may denote a neighboring block positioned at a top of the top-left sample position of the current block, and the neighboring block C may denote a neighboring block positioned at a left-side of the top-left sample position of the current block. Additionally, the neighboring block D may denote a neighboring block positioned at a top of a top-right sample position of the current block, and the neighboring block E may denote a neighboring block positioned at a top-right of the top-right sample position of the current block. Additionally, the neighboring block F may denote a neighboring block positioned at a left side of a bottom-left sample position of the current block, and the neighboring block G may denote a neighboring block positioned at a bottom-left of the bottom-left sample position of the current block.

The encoding apparatus/decoding apparatus may add an HEVC AMVP candidate to the affine MVP list of the current block (S1430). In case a number of available inherited candidates and/or constructed candidates is less than 2, the encoding apparatus/decoding apparatus may add an HEVC AMVP candidate to the affine MVP list of the current block. More specifically, in case the number of available inherited candidates and/or constructed candidates is less than 2, the encoding apparatus/decoding apparatus may perform a process of configuring MVP candidates of the existing HEVC standard.

Figure 15:
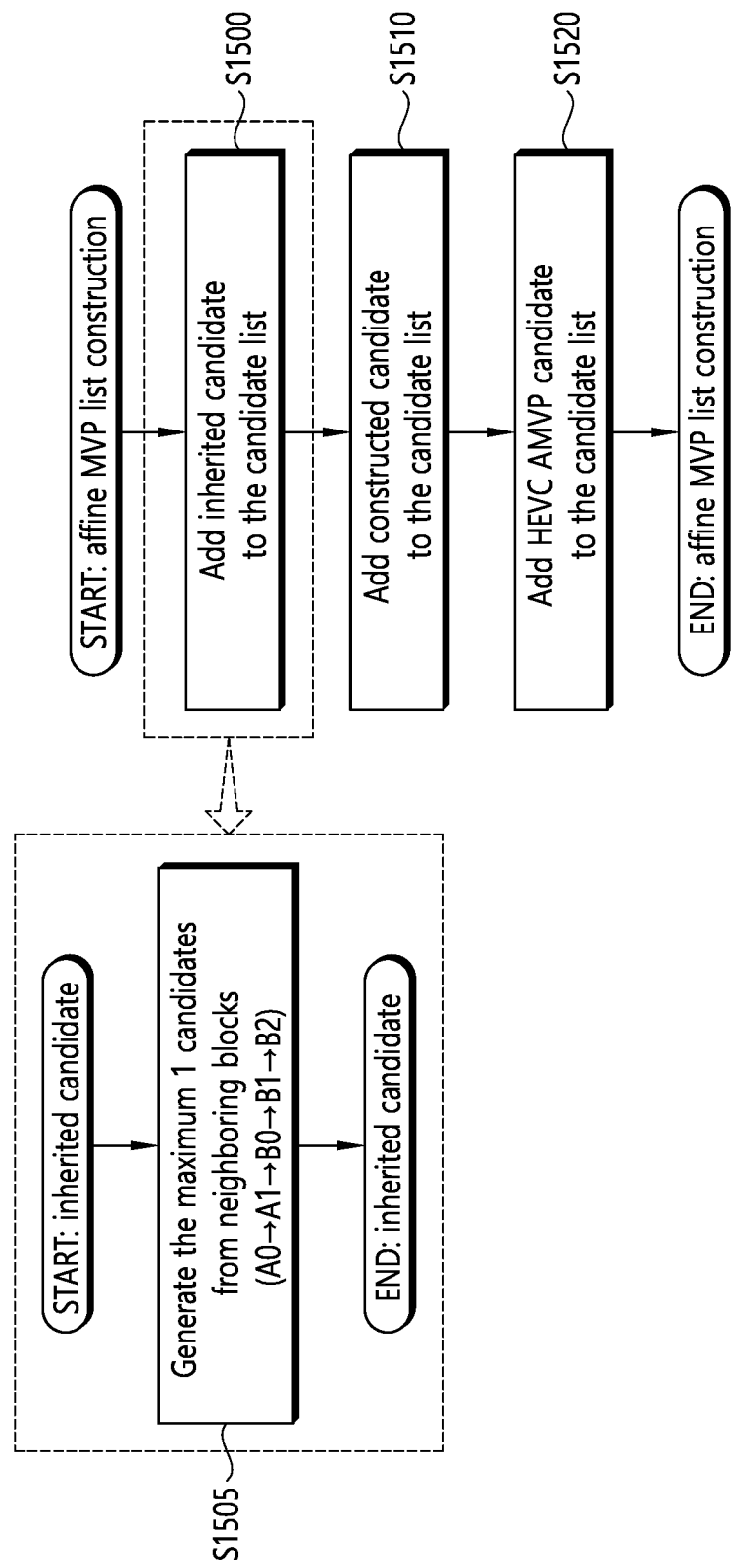
FIG. 15 illustrates an example for constructing an affine MVP list.

FIG. 15 illustrates an example for constructing an affine MVP list.

Referring to FIG. 15, an encoding apparatus/decoding apparatus may add an inherited candidate to an affine MVP list of a current block (S1500). The inherited candidate may represent the above-described inherited affine candidate.

More specifically, the encoding apparatus/decoding apparatus may derive a maximum of 1 inherited affine candidate from neighboring blocks of the current block (S1505). Herein, the neighboring blocks may include a left neighboring block A0 of the current block, a bottom-left corner neighboring block A1 of the current block, a top neighboring block B0 of the current block, a top-right corner neighboring block B1 of the current block, and a top-left corner neighboring block B2 of the current block.

For example, the encoding apparatus/decoding apparatus may derive a first affine MVP candidate based on a first block within the neighboring blocks. Herein, the first block may be coded by using an affine motion model, and a reference picture of the first block and a reference picture of the current block may be the same. More specifically, when checking the neighboring blocks by a specific order, the first block may be a first block that is verified to be satisfying the conditions. The conditions may be that coding is performed by using the affine motion model, and that a reference picture of the block is the same as the reference picture of the current block.

Meanwhile, the specific order may be left neighboring block A0→bottom-left corner neighboring block A1→top neighboring block B0→top-right corner neighboring block B1→top-left corner neighboring block B2. Additionally, the checking may be performed by an order other than the above-described order and may not be limited only to the above-described example.

The encoding apparatus/decoding apparatus may add a constructed candidate to an affine MVP list of the current block (S1510). The constructed candidate may represent the above-described constructed affine candidate. In case a number of available inherited candidates is less than 2, the encoding apparatus/decoding apparatus may add a constructed candidate to an affine MVP list of the current block.

The encoding apparatus/decoding apparatus may derive $mv_0$ from a first group, $mv_1$ from a second group, and $mv_2$ from a third group, and the encoding apparatus/decoding apparatus may derive the constructed affine candidate including the $mv_0$, the $mv_1$, and the $mv_2$. The $mv_0$ may be a CPMVP candidate of CP0, the $mv_1$ may be a CPMVP candidate of CP1, and the $mv_2$ may be a CPMVP candidate of CP2.

Herein, a reference picture for the $mv_0$ may be the same as a reference picture of the current block. More specifically, when checking motion vectors within the first group according to a specific order, the $mv_0$ may be a first motion vector that is verified to be satisfying a condition. The condition may be that a reference picture for a motion vector is the same as a reference picture of the current block. Additionally, a reference picture for the mv may be the same as a reference picture of the current block. More specifically, when checking motion vectors within the second group according to a specific order, the $mv_1$ may be a first motion vector that is verified to be satisfying a condition. The condition may be that a reference picture for a motion vector is the same as a reference picture of the current block. Additionally, a reference picture for the $mv_2$ may be the same as a reference picture of the current block. More specifically, when checking motion vectors within the third group according to a specific order, the $mv_2$ may be a first motion vector that is verified to be satisfying a condition. The condition may be that a reference picture for a motion vector is the same as a reference picture of the current block.

Additionally, the first group may include a motion vector of the neighboring block A, a motion vector of the neighboring block B, and a motion vector of the neighboring block C. The second group may include a motion vector of the neighboring block D and a motion vector of the neighboring block E. The third group may include a motion vector of the neighboring block F and a motion vector of the neighboring block G. The neighboring block A may denote a neighboring block positioned at a top-left of a top-left sample position of the current block, the neighboring block B may denote a neighboring block positioned at a top of the top-left sample position of the current block, and the neighboring block C may denote a neighboring block positioned at a left-side of the top-left sample position of the current block. Additionally, the neighboring block D may denote a neighboring block positioned at a top of a top-right sample position of the current block, and the neighboring block E may denote a neighboring block positioned at a top-right of the top-right sample position of the current block. Additionally, the neighboring block F may denote a neighboring block positioned at a left side of a bottom-left sample position of the current block, and the neighboring block G may denote a neighboring block positioned at a bottom-left of the bottom-left sample position of the current block.

The encoding apparatus/decoding apparatus may add an HEVC AMVP candidate to the affine MVP list of the current block (S1520). In case a number of available inherited candidates and/or constructed candidates is less than 2, the encoding apparatus/decoding apparatus may add an HEVC AMVP candidate to the affine MVP list of the current block. More specifically, in case the number of available inherited candidates and/or constructed candidates is less than 2, the encoding apparatus/decoding apparatus may perform a process of configuring MVP candidates of the existing HEVC standard.

The embodiments disclosed in the above-described flow charts have differences in the process of deriving the inherited affine candidate(s). Therefore, comparison may be made between the above-described embodiments by performing a complexity analysis of the process of deriving the inherited affine candidate(s).

The complexity analysis of the above-described embodiments may be derived as shown below in the following table.

TABLE 8-continued

| | | | | | |
|---|---|---|---|---|---|
| Overall | −0.22% | −0.11% | −0.11% | 100% | 100% |
| Class D | −0.05% | −0.18% | −0.05% | 101% | 103% |

| Proposed (Section 2.4) over VTM1.0 + Affine + High Precision MV | | | | | |
|---|---|---|---|---|---|
| | Y | U | V | EncT | DecT |
| Class A1 | −0.07% | −0.14% | 0.07% | 99% | 99% |
| Class A2 | −0.50% | −0.47% | −0.42% | 99% | 100% |
| Class B | −0.26% | 0.07% | −0.17% | 100% | 98% |
| Class C | −0.10% | −0.13% | 0.05% | 99% | 95% |
| Overall | −0.23% | −0.13% | −0.11% | 99% | 98% |
| Class D | −0.03% | −0.34% | 0.15% | 100% | 101% |

Referring to Table 7, it may be verified that the embodiment of FIG. 14 and the embodiment of FIG. 15 have lower complexity than the embodiment of FIG. 13. Additionally, referring to Table 8, it may be verified that coding performances of the embodiment of FIG. 13, the embodiment of FIG. 14, and the embodiment of FIG. 15 are almost the same. Therefore, the embodiment of FIG. 14 and the embodiment of FIG. 15, which have lower complexity and the same coding performance, may be considered more for the encoding/decoding process.

Figure 16:
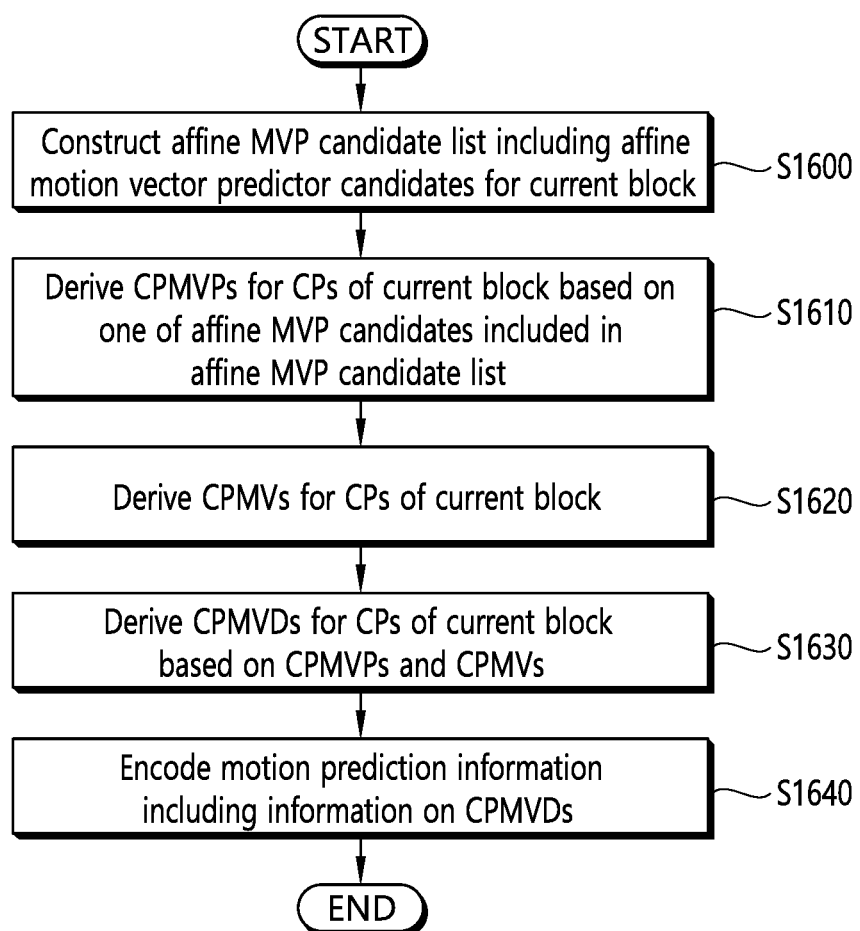
FIG. 16 illustrates a general view of an image encoding method performed by an encoding apparatus according to the present disclosure.

FIG. 16 illustrates a general view of an image encoding method performed by an encoding apparatus according to the present disclosure. The method proposed in FIG. 16 may be performed by the encoding apparatus (or device) dis-

TABLE 7

| | | | | Inherited affine AMVP candidates | | | | | |
|---|---|---|---|---|---|---|---|---|---|
| | Length of AMVP candidate list | max number of motion vector scaling operation | max number of potential candidate positions | max number of derived candidates | max number of comparison operation | max number of shift operation | max number of multi. operation | max number of div. operation | max number of add operation | max number of absolute operation |
| FIG. 13 | 2 | 0 | 5 | 10 | 36 | 100 | 0 | 0 | 100 | 0 |
| FIG. 14 | 2 | 0 | 5 | 2 | 4 | 20 | 0 | 0 | 20 | 0 |
| FIG. 15 | 2 | 0 | 5 | 1 | 0 | 10 | 0 | 0 | 10 | 0 |

Additionally, the coding performance of the above-described embodiments may be derived as shown below in the following table.

TABLE 8

| VTM-2.0 over VTM1.0 + Affine + High Precision MV | | | | | |
|---|---|---|---|---|---|
| | Y | U | V | EncT | DecT |
| Class A1 | −0.04% | −0.11% | −0.01% | 101% | 100% |
| Class A2 | −0.51% | −0.29% | −0.49% | 99% | 100% |
| Class B | −0.28% | −0.03% | −0.08% | 100% | 99% |
| Class C | −0.01% | −0.11% | −0.13% | 98% | 93% |
| Overall | −0.21% | −0.12% | −0.16% | 100% | 98% |
| Class D | −0.01% | −0.23% | −0.10% | 101% | 101% |

| Proposed (Section 2.3) over VTM1.0 + Affine + High Precision MV | | | | | |
|---|---|---|---|---|---|
| | Y | U | V | EncT | DecT |
| Class A1 | −0.02% | −0.10% | 0.19% | 100% | 101% |
| Class A2 | −0.49% | −0.44% | −0.38% | 100% | 101% |
| Class B | −0.31% | 0.03% | −0.16% | 100% | 98% |
| Class C | −0.07% | −0.04% | −0.07% | 100% | 100% | closed in FIG. 1. More specifically, for example, steps S1600 to S1630 of FIG. 16 may be performed by a predictor of the encoding apparatus, and step S1640 may be performed by an entropy encoder of the encoding apparatus. Additionally, although it is not shown in the drawing, a process of deriving prediction samples for the current block based on the CPMVs may be performed by a predictor of the encoding apparatus. A process of deriving a residual sample for the current block based on an original sample and prediction sample for the current block may be performed by a subtractor of the encoding apparatus. A process of generating information related to a residual for the current block based on the residual sample may be performed by a transformer of the encoding apparatus. And, a process of encoding the information related to the residual may be performed by an entropy encoder of the encoding apparatus.

The encoding apparatus constructs an affine MVP candidate list including affine Motion Vector Predictor (MVP) candidates for the current block (S1600).

For example, the affine MVP candidates may include a first affine MVP candidate and a second affine MVP candidate.

The first affine MVP candidate may be derived based on a first block within a left block group, which includes a bottom-left corner neighboring block and a left neighboring block of the current block. Herein, the first block may be coded by using an affine motion model, and a reference picture of the first block and a reference picture of the current block may be the same.

More specifically, the first block may be a first block that is verified to be satisfying the conditions, when checking neighboring blocks within the left block group according to a specific order. The conditions may be that coding is performed by using an affine motion model, and that a reference picture of a block is the same as a reference picture of the current block. For example, the encoding apparatus may check according to the specific order whether or not blocks within the left block group satisfy the conditions, the encoding apparatus may then derive a first block being the first to satisfy the conditions and may derive the first affine MVP candidate based on the first block.

More specifically, for example, the encoding apparatus may derive motion vectors for CPs of the current block based on an affine motion model of the first block and may derive the first affine MVP candidate including the motion vectors as CPMVP candidates. The affine motion model may be derived as shown in Equation 1 or Equation 3, which are presented above.

Meanwhile, the specific order for checking blocks within the left block group may be an order starting from the left neighboring block to the bottom-left corner neighboring block. Alternatively, the specific order for checking the left block group may be an order starting from the bottom-left corner neighboring block to the left neighboring block.

The second affine MVP candidate may be derived based on a second block within a top block group, which includes a top-right corner neighboring block, a top neighboring block, and a top-left corner neighboring block of the current block. Herein, the second block may be coded by using an affine motion model, and a reference picture of the second block and a reference picture of the current block may be the same.

More specifically, the second block may be a first block that is verified to be satisfying the conditions, when checking neighboring blocks within the top block group according to a specific order. The conditions may be that coding is performed by using an affine motion model, and that a reference picture of a block is the same as a reference picture of the current block. For example, the encoding apparatus may check according to the specific order whether or not blocks within the top block group satisfy the conditions, the encoding apparatus may then derive a second block being the first to satisfy the conditions and may derive the second affine MVP candidate based on the second block.

More specifically, for example, the encoding apparatus may derive motion vectors for CPs of the current block based on an affine motion model of the second block and may derive the second affine MVP candidate including the motion vectors as CPMVP candidates. The affine motion model may be derived as shown in Equation 1 or Equation 3, which are presented above.

Meanwhile, the specific order for checking blocks within the top block group may be an order starting from the top neighboring block to the top-right corner neighboring block and the top-left corner neighboring block.

Additionally, as another example, the affine MVP candidates may include a first affine MVP candidate, which is derived as described below.

The first affine MVP candidate may be derived based on a first block within neighboring blocks of the current block. Herein, the first block may be coded by using an affine motion model, and a reference picture of the first block and a reference picture of the current block may be the same. Additionally, the neighboring blocks may include the left neighboring block, the bottom-left corner neighboring block, the top-right corner neighboring block, the top neighboring block, and the top-left corner neighboring block of the current block.

The first block may be a first block that is verified to be satisfying the conditions, when checking the neighboring blocks according to a specific order. The conditions may be that coding is performed by using an affine motion model, and that a reference picture of a block is the same as a reference picture of the current block. For example, the encoding apparatus may check according to the specific order whether or not the neighboring blocks satisfy the conditions, the encoding apparatus may then derive a first block being the first to satisfy the conditions and may derive the first affine MVP candidate based on the first block.

More specifically, for example, the encoding apparatus may derive motion vectors for CPs of the current block based on an affine motion model of the first block and may derive the first affine MVP candidate including the motion vectors as CPMVP candidates. The affine motion model may be derived as shown in Equation 1 or Equation 3, which are presented above.

Meanwhile, the specific order for checking the neighboring blocks may be an order starting from the left neighboring block to the bottom-left corner neighboring block, the top neighboring block, the top-right corner neighboring block, and the top-left corner neighboring block.

Herein, for example, in case the size of the current block is W×H, and, in case, the x component of the top-left sample position of the current block is 0 and the y component is 0, the left neighboring block may be a block including a sample of coordinates (−1, H−1), the top neighboring block may be a block including a sample of coordinates (W−1, −1), the top-right neighboring block may be a block including a sample of coordinates (W, −1), the bottom-left neighboring block may be a block including a sample of coordinates (−1, H), and the top-left neighboring block may be a block including a sample of coordinates (−1, −1).

Meanwhile, in case the first affine MVP candidate and/or the second affine MVP candidate are/is not derived, i.e., in case a number of affine MVP candidates less than 2 are/is derived by performing the above-described process, the affine MVP candidates may include a constructed affine MVP candidate.

In other words, for example, in case the first affine MVP candidate and/or the second affine MVP candidate are/is not derived, i.e., in case a number of affine MVP candidates less than 2 are/is derived by performing the above-described process, the encoding apparatus may derive a constructed affine MVP candidate based on the neighboring blocks.

More specifically, the encoding apparatus may divide the motion vectors of the neighboring blocks into a first group, a second group, and a third group. The first group may include a motion vector of neighboring block A, a motion vector of neighboring block B, and a motion vector of neighboring block C. The second group may include a motion vector of neighboring block D and a motion vector of neighboring block E. And, the third group may include a motion vector of neighboring block F and a motion vector of neighboring block G.

Additionally, the encoding apparatus may derive a CPMVP candidate for CP0 of the current block from the first group, a CPMVP candidate for CP1 of the current block from the second group, and a CPMVP candidate for CP2 of the current block from the third group. And, the encoding apparatus may derive the constructed affine MVP candidate including the CPMVP candidates for the CPs.

The CPMVP candidate for CP0 may be a first motion vector that is verified to be satisfying conditions, when checking motion vectors within the first group according to a specific order. The condition may be that a reference picture for a motion vector is the same as a reference picture of the current block. In other words, the CPMVP candidate for CP0 may be a motion vector having a reference picture that is first verified to be the same as a reference picture of the current block, when checking motion vectors within the first group according to a specific order. For example, the encoding apparatus may check motion vectors within the first group according to the specific order to verify if the motion vectors satisfy the condition, and the first motion vector that is verified to be satisfying the condition may be derived as the CPMVP candidate for CP0. Herein, for example, the specific order may be an order starting from the neighboring block A to the neighboring block B and the neighboring block C.

The CPMVP candidate for CP1 may be a first motion vector that is verified to be satisfying conditions, when checking motion vectors within the second group according to a specific order. The condition may be that a reference picture for a motion vector is the same as a reference picture of the current block. In other words, the CPMVP candidate for CP1 may be a motion vector having a reference picture that is first verified to be the same as a reference picture of the current block, when checking motion vectors within the second group according to a specific order. For example, the encoding apparatus may check motion vectors within the second group according to the specific order to verify if the motion vectors satisfy the condition, and the first motion vector that is verified to be satisfying the condition may be derived as the CPMVP candidate for CP1. Herein, for example, the specific order may be an order starting from the neighboring block D to the neighboring block E.

The CPMVP candidate for CP2 may be a first motion vector that is verified to be satisfying conditions, when checking motion vectors within the third group according to a specific order. The condition may be that a reference picture for a motion vector is the same as a reference picture of the current block. In other words, the CPMVP candidate for CP2 may be a motion vector having a reference picture that is first verified to be the same as a reference picture of the current block, when checking motion vectors within the third group according to a specific order. For example, the encoding apparatus may check motion vectors within the third group according to the specific order to verify if the motion vectors satisfy the condition, and the first motion vector that is verified to be satisfying the condition may be derived as the CPMVP candidate for CP2. Herein, for example, the specific order may be an order starting from the neighboring block F to the neighboring block G.

Herein, the neighboring block A may represent a neighboring block positioned at the top-left of a top-left sample position of the current block, the neighboring block B may represent a neighboring block positioned at the top of the top-left sample position of the current block, and the neighboring block C may represent a neighboring block positioned at a left-side of the top-left sample position of the current block, the neighboring block D may represent a neighboring block positioned at the top of a top-right sample position of the current block, the neighboring block E may represent a neighboring block positioned at the top-right of the top-right sample position of the current block, the neighboring block F may represent a neighboring block positioned at a left-side of a bottom-left sample position of the current block, and the neighboring block G may represent a neighboring block positioned at the bottom-left of the bottom-left sample position of the current block.

Herein, for example, in case the size of the current block is W×H, and, in case, the x component of the top-left sample position of the current block is 0 and the y component is 0, the neighboring block A may be a block including a sample of coordinates (−1, −1), the neighboring block B may be a block including a sample of coordinates (0, −1), the neighboring block C may be a block including a sample of coordinates (−1, 0), the neighboring block D may be a block including a sample of coordinates (W−1, −1), the neighboring block E may be a block including a sample of coordinates (W, −1), the neighboring block F may be a block including a sample of coordinates (−1, H−1), and the neighboring block G may be a block including a sample of coordinates (−1, H). Additionally, the CP0 may denote a top-left position of the current block, the CP1 may denote a top-right position of the current block, and the CP2 may denote a bottom-left position of the current block. In other words, the CPs may include CP0 being positioned at a top-left sample position of the current block and CP1 being positioned at a top-right sample position of the current block, and the CPs may further include CP2 being positioned at a bottom-left sample position of the current block.

Meanwhile, in case a CPMVP candidate for CP0 of the current block is derived from the first group, in case a CPMVP candidate for CP1 of the current block is derived from the second group, and a CPMVP candidate for CP2 of the current block is not derived from the third group, the CPMVP candidate for CP2 may be derived by using the above-described Equation 8 based on the CPMVP candidate for CP0 and the CPMVP candidate for CP1.

Additionally, in case a CPMVP candidate for CP0 of the current block is derived from the first group, in case a CPMVP candidate for CP2 of the current block is derived from the third group, and a CPMVP candidate for CP1 of the current block is not derived from the second group, the CPMVP candidate for CP1 may be derived by using the above-described Equation 9 based on the CPMVP candidate for CP0 and the CPMVP candidate for CP2.

Meanwhile, in case a number of affine MVP candidates less than 2 are/is derived by performing the above-described process, the affine MVP candidates may include MVP candidates of the existing HEVC standard.

In other words, for example, in case less than 2 affine MVP candidates are/is derived by performing the above-described process, the encoding apparatus may derive MVP candidates of the existing HEVC standard.

The encoding apparatus derives Control Point Motion Vector Predictors (CPMVPs) for Control Points (CPs) of the current block based on one affine MVP candidate among the affine MVP candidates included in the affine MVP candidate list (S1610). The encoding apparatus may derive CPMVs for the CPs of the current block having an optimal RD cost and may select an affine MVP candidate most similar to the CPMVs, among the affine MVP candidates, as the affine MVP candidate for the current block. Based on the selected affine MVP candidate, which is selected from the affine MVP candidate list, the encoding apparatus may derive Control Point Motion Vector Predictors (CPMVPs) for Control Points (CPs) of the current block.

The encoding apparatus may encode an affine MVP candidate index indicating the selected affine MVP candidate among the affine MVP candidates. The affine MVP candidate index may indicate the one affine MVP candidate, which is selected from the affine MVP candidates being included in the affine Motion Vector Predictor (MVP) candidate list for the current block.

The encoding apparatus derives CPMVs for the CPs of the current block (S1620). The encoding apparatus may derive CPMVs for each of the CPs of the current block.

The encoding apparatus derives Control Point Motion Vector Differences (CPMVDs) for the CPs of the current block based on the CPMVPs and the CPMVs (S1630). The encoding apparatus may derive CPMVPs for the CPs of the current block based on the CPMVPs and the CPMVs for each of the CPs.

The encoding apparatus encodes motion prediction information including information on the CPMVDs (S1640). The encoding apparatus may output the motion prediction information including information on the CPMVDs in a bitstream format. In other words, the encoding apparatus may output image (or video) information including the motion prediction information in a bitstream format. The encoding apparatus may encode information on the CPMVDs for each of the CPs, and the motion prediction information may include information on the CPMVDs.

Additionally, the motion prediction information may include the affine MVP candidate index. The affine MVP candidate index may indicate the selected affine MVP candidate, which is selected from the affine MVP candidates being included in the affine Motion Vector Predictor (MVP) candidate list for the current block.

Meanwhile, for example, the encoding apparatus may derive prediction samples for the current block based on the CPMVs and may derive a residual sample for the current block based on an original sample and prediction sample for the current block. Then, the encoding apparatus may generate information on a residual for the current block may be generated based on the residual sample and may encode the information on the residual. The image information may include the information on the residual.

Meanwhile, the bitstream may be transmitted to a decoding apparatus through a network or a (digital) storage medium. Herein, the network may include a broadcast network and/or a communication network, and so on, and the digital storage medium may include various storage media, such as USB, SD, CD, DVD, Bluray, HDD, SSD, and so on.

Figure 17:
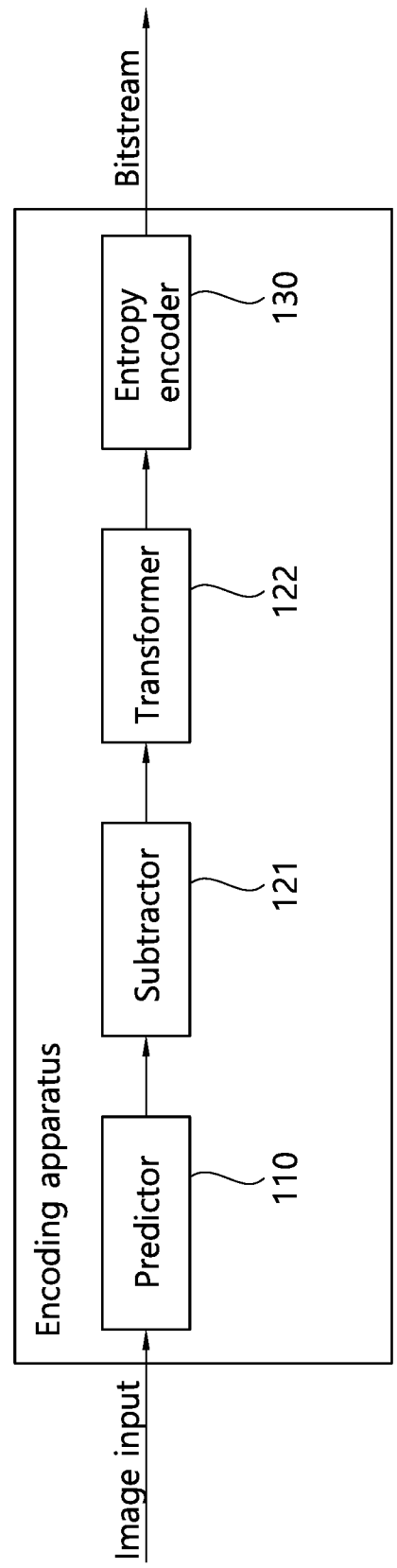
FIG. 17 illustrates a general view of an encoding apparatus performing an image encoding method according to the present disclosure.

FIG. 17 illustrates a general view of an encoding apparatus performing an image encoding method according to the present disclosure. The method disclosed in FIG. 16 may be performed by the encoding apparatus disclosed in FIG. 17. More specifically, for example, a predictor of the encoding apparatus of FIG. 17 may perform steps S1600 to S1630 of FIG. 16, and an entropy encoder of the encoding apparatus of FIG. 17 may perform step S1640 of FIG. 16. Additionally, although it is not shown in the drawing, a process of deriving prediction samples for the current block based on the CPMVs may be performed by a predictor of the encoding apparatus of FIG. 17. A process of deriving a residual sample for the current block based on an original sample and prediction sample for the current block may be performed by a subtractor of the encoding apparatus of FIG. 17. A process of generating information related to a residual for the current block based on the residual sample may be performed by a transformer of the encoding apparatus of FIG. 17. And, a process of encoding the information related to the residual may be performed by an entropy encoder of the encoding apparatus of FIG. 17.

Figure 18:
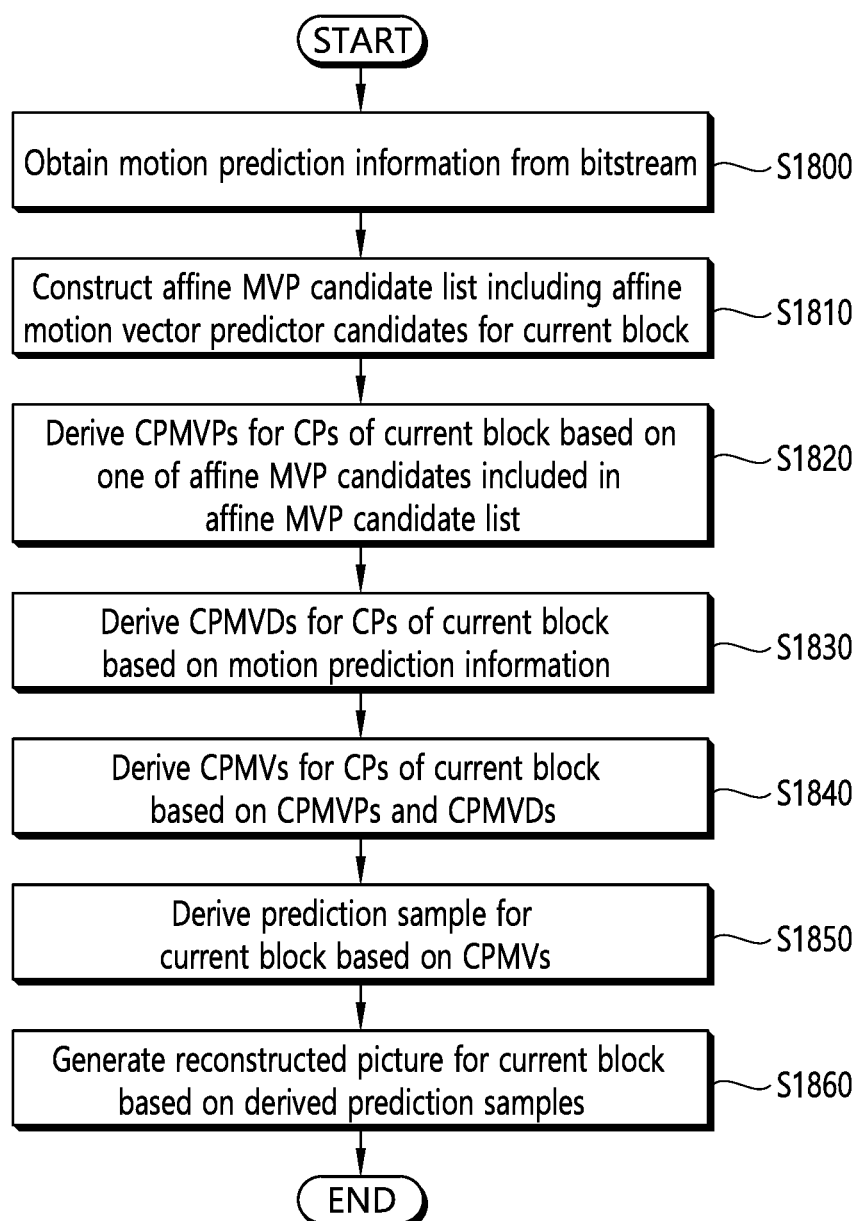
FIG. 18 illustrates a general view of an image decoding method performed by a decoding apparatus according to the present disclosure.

FIG. 18 illustrates a general view of an image decoding method performed by a decoding apparatus according to the present disclosure. The method proposed in FIG. 18 may be performed by the decoding apparatus (or device) disclosed in FIG. 2. More specifically, for example, steps S1810 to S1850 of FIG. 18 may be performed by a predictor of the decoding apparatus, and step S1860 may be performed by an adder of the decoding apparatus. Additionally, although it is not shown in the drawing, a process of obtaining information on a residual for the current block through a bitstream may be performed by an entropy decoder of the decoding apparatus, and a process of deriving the residual sample for the current block based on the residual information may be performed by an inverse transformer of the decoding apparatus.

The decoding apparatus may obtain motion prediction information from a bitstream (S1800). The decoding apparatus may obtain image (or video) information including the motion prediction information from the bitstream.

Additionally, for example, the motion prediction information may include information on Control Point Motion Vector Differences (CPMVDs) for control points (CPs) of the current block. In other words, the motion prediction information may include information on the CPMVDs for each of the CPs of the current block.

Additionally, for example, the motion prediction information may include an affine MVP candidate index for the current block. The affine MVP candidate index may indicate one of the affine MVP candidates included in an affine Motion Vector Predictor (MVP) candidate list for the current block.

The decoding apparatus constructs an affine MVP candidate list including affine Motion Vector Predictor (MVP) candidates for the current block (S1810).

For example, the affine MVP candidates may include a first affine MVP candidate and a second affine MVP candidate.

The first affine MVP candidate may be derived based on a first block within a left block group, which includes a bottom-left corner neighboring block and a left neighboring block of the current block. Herein, the first block may be coded by using an affine motion model, and a reference picture of the first block and a reference picture of the current block may be the same.

More specifically, the first block may be a first block that is verified to be satisfying the conditions, when checking neighboring blocks within the left block group according to a specific order. The conditions may be that coding is performed by using an affine motion model, and that a reference picture of a block is the same as a reference picture of the current block. For example, the decoding apparatus may check according to the specific order whether or not blocks within the left block group satisfy the conditions, the decoding apparatus may then derive a first block being the first to satisfy the conditions and may derive the first affine MVP candidate based on the first block.

More specifically, for example, the decoding apparatus may derive motion vectors for CPs of the current block based on an affine motion model of the first block and may derive the first affine MVP candidate including the motion vectors as CPMVP candidates. The affine motion model may be derived as shown in Equation 1 or Equation 3, which are presented above.

Meanwhile, the specific order for checking blocks within the left block group may be an order starting from the left neighboring block to the bottom-left corner neighboring block. Alternatively, the specific order for checking the left block group may be an order starting from the bottom-left corner neighboring block to the left neighboring block.

The second affine MVP candidate may be derived based on a second block within a top block group, which includes a top-right corner neighboring block, a top neighboring block, and a top-left corner neighboring block of the current block. Herein, the second block may be coded by using an affine motion model, and a reference picture of the second block and a reference picture of the current block may be the same.

More specifically, the second block may be a first block that is verified to be satisfying the conditions, when checking neighboring blocks within the top block group according to a specific order. The conditions may be that coding is performed by using an affine motion model, and that a reference picture of a block is the same as a reference picture of the current block. For example, the decoding apparatus may check according to the specific order whether or not blocks within the top block group satisfy the conditions, the decoding apparatus may then derive a second block being the first to satisfy the conditions and may derive the second affine MVP candidate based on the second block.

More specifically, for example, the decoding apparatus may derive motion vectors for CPs of the current block based on an affine motion model of the second block and may derive the second affine MVP candidate including the motion vectors as CPMVP candidates. The affine motion model may be derived as shown in Equation 1 or Equation 3, which are presented above.

Meanwhile, the specific order for checking blocks within the top block group may be an order starting from the top neighboring block to the top-right corner neighboring block and the top-left corner neighboring block.

Additionally, as another example, the affine MVP candidates may include a first affine MVP candidate, which is derived as described below.

The first affine MVP candidate may be derived based on a first block within neighboring blocks of the current block. Herein, the first block may be coded by using an affine motion model, and a reference picture of the first block and a reference picture of the current block may be the same. Additionally, the neighboring blocks may include the left neighboring block, the bottom-left corner neighboring block, the top-right corner neighboring block, the top neighboring block, and the top-left corner neighboring block of the current block.

The first block may be a first block that is verified to be satisfying the conditions, when checking the neighboring blocks according to a specific order. The conditions may be that coding is performed by using an affine motion model, and that a reference picture of a block is the same as a reference picture of the current block. For example, the decoding apparatus may check according to the specific order whether or not the neighboring blocks satisfy the conditions, the decoding apparatus may then derive a first block being the first to satisfy the conditions and may derive the first affine MVP candidate based on the first block.

More specifically, for example, the decoding apparatus may derive motion vectors for CPs of the current block based on an affine motion model of the first block and may derive the first affine MVP candidate including the motion vectors as CPMVP candidates. The affine motion model may be derived as shown in Equation 1 or Equation 3, which are presented above.

Meanwhile, the specific order for checking the neighboring blocks may be an order starting from the left neighboring block to the bottom-left corner neighboring block, the top neighboring block, the top-right corner neighboring block, and the top-left corner neighboring block.

Herein, for example, in case the size of the current block is W×H, and, in case, the x component of the top-left sample position of the current block is 0 and the y component is 0, the left neighboring block may be a block including a sample of coordinates (−1, H−1), the top neighboring block may be a block including a sample of coordinates (W−1, −1), the top-right neighboring block may be a block including a sample of coordinates (W, −1), the bottom-left neighboring block may be a block including a sample of coordinates (−1, H), and the top-left neighboring block may be a block including a sample of coordinates (−1, −1).

Meanwhile, in case the first affine MVP candidate and/or the second affine MVP candidate are/is not derived, i.e., in case a number of affine MVP candidates less than 2 are/is derived by performing the above-described process, the affine MVP candidates may include a constructed affine MVP candidate.

In other words, for example, in case the first affine MVP candidate and/or the second affine MVP candidate are/is not derived, i.e., in case a number of affine MVP candidates less than 2 are/is derived by performing the above-described process, the decoding apparatus may derive a constructed affine MVP candidate based on the neighboring blocks.

More specifically, the decoding apparatus may divide the motion vectors of the neighboring blocks into a first group, a second group, and a third group. The first group may include a motion vector of neighboring block A, a motion vector of neighboring block B, and a motion vector of neighboring block C. The second group may include a motion vector of neighboring block D and a motion vector of neighboring block E. And, the third group may include a motion vector of neighboring block F and a motion vector of neighboring block G.

Additionally, the decoding apparatus may derive a CPMVP candidate for CP0 of the current block from the first group, a CPMVP candidate for CP1 of the current block from the second group, and a CPMVP candidate for CP2 of the current block from the third group. And, the decoding apparatus may derive the constructed affine MVP candidate including the CPMVP candidates for the CPs.

The CPMVP candidate for CP0 may be a first motion vector that is verified to be satisfying conditions, when checking motion vectors within the first group according to a specific order. The condition may be that a reference picture for a motion vector is the same as a reference picture of the current block. In other words, the CPMVP candidate for CP0 may be a motion vector having a reference picture that is first verified to be the same as a reference picture of the current block, when checking motion vectors within the first group according to a specific order. For example, the decoding apparatus may check motion vectors within the first group according to the specific order to verify if the motion vectors satisfy the condition, and the first motion vector that is verified to be satisfying the condition may be derived as the CPMVP candidate for CP0. Herein, for example, the specific order may be an order starting from the neighboring block A to the neighboring block B and the neighboring block C.

The CPMVP candidate for CP1 may be a first motion vector that is verified to be satisfying conditions, when checking motion vectors within the second group according to a specific order. The condition may be that a reference picture for a motion vector is the same as a reference picture of the current block. In other words, the CPMVP candidate for CP1 may be a motion vector having a reference picture that is first verified to be the same as a reference picture of the current block, when checking motion vectors within the second group according to a specific order. For example, the decoding apparatus may check motion vectors within the second group according to the specific order to verify if the motion vectors satisfy the condition, and the first motion vector that is verified to be satisfying the condition may be derived as the CPMVP candidate for CP1. Herein, for example, the specific order may be an order starting from the neighboring block D to the neighboring block E.

The CPMVP candidate for CP2 may be a first motion vector that is verified to be satisfying conditions, when checking motion vectors within the third group according to a specific order. The condition may be that a reference picture for a motion vector is the same as a reference picture of the current block. In other words, the CPMVP candidate for CP2 may be a motion vector having a reference picture that is first verified to be the same as a reference picture of the current block, when checking motion vectors within the third group according to a specific order. For example, the decoding apparatus may check motion vectors within the third group according to the specific order to verify if the motion vectors satisfy the condition, and the first motion vector that is verified to be satisfying the condition may be derived as the CPMVP candidate for CP2. Herein, for example, the specific order may be an order starting from the neighboring block F to the neighboring block G.

Herein, the neighboring block A may represent a neighboring block positioned at the top-left of a top-left sample position of the current block, the neighboring block B may represent a neighboring block positioned at the top of the top-left sample position of the current block, and the neighboring block C may represent a neighboring block positioned at a left-side of the top-left sample position of the current block, the neighboring block D may represent a neighboring block positioned at the top of a top-right sample position of the current block, the neighboring block E may represent a neighboring block positioned at the top-right of the top-right sample position of the current block, the neighboring block F may represent a neighboring block positioned at a left-side of a bottom-left sample position of the current block, and the neighboring block G may represent a neighboring block positioned at the bottom-left of the bottom-left sample position of the current block.

Herein, for example, in case the size of the current block is W×H, and, in case, the x component of the top-left sample position of the current block is 0 and the y component is 0, the neighboring block A may be a block including a sample of coordinates (−1, −1), the neighboring block B may be a block including a sample of coordinates (0, −1), the neighboring block C may be a block including a sample of coordinates (−1, 0), the neighboring block D may be a block including a sample of coordinates (W−1, −1), the neighboring block E may be a block including a sample of coordinates (W, −1), the neighboring block F may be a block including a sample of coordinates (−1, H−1), and the neighboring block G may be a block including a sample of coordinates (−1, H). Additionally, the CP0 may denote a top-left position of the current block, the CP1 may denote a top-right position of the current block, and the CP2 may denote a bottom-left position of the current block. In other words, the CPs may include CP0 being positioned at a top-left sample position of the current block and CP1 being positioned at a top-right sample position of the current block, and the CPs may further include CP2 being positioned at a bottom-left sample position of the current block.

Meanwhile, in case a CPMVP candidate for CP0 of the current block is derived from the first group, in case a CPMVP candidate for CP1 of the current block is derived from the second group, and a CPMVP candidate for CP2 of the current block is not derived from the third group, the CPMVP candidate for CP2 may be derived by using the above-described Equation 8 based on the CPMVP candidate for CP0 and the CPMVP candidate for CP1.

Additionally, in case a CPMVP candidate for CP0 of the current block is derived from the first group, in case a CPMVP candidate for CP2 of the current block is derived from the third group, and a CPMVP candidate for CP1 of the current block is not derived from the second group, the CPMVP candidate for CP1 may be derived by using the above-described Equation 9 based on the CPMVP candidate for CP0 and the CPMVP candidate for CP2.

Meanwhile, in case a number of affine MVP candidates less than 2 are/is derived by performing the above-described process, the affine MVP candidates may include MVP candidates of the existing HEVC standard.

In other words, for example, in case less than 2 affine MVP candidates are/is derived by performing the above-described process, the decoding apparatus may derive MVP candidates of the existing HEVC standard.

The decoding apparatus derives Control Point Motion Vector Predictors (CPMVPs) for Control Points (CPs) of the current block based on one affine MVP candidate among the affine MVP candidates included in the affine MVP candidate list (S1820).

The decoding apparatus may select a specific affine MVP candidate from the affine MVP candidates included in the affine MVP candidate list, and the decoding apparatus may then derive the selected affine MVP candidate as CPMVPs for the CPs of the current block. For example, the decoding apparatus may obtain the affine MVP candidate index for the current block from the bitstream, and, then, the decoding apparatus may derive an affine MVP candidate, which is indicated by the affine MVP candidate index, among the affine MVP candidates including the affine MVP candidate list, as CPMVPs for the CPs of the current block.

The decoding apparatus derives Control Point Motion Vector Differences (CPMVDs) for the CPs of the current block based on the motion prediction information (S1830). The motion prediction information may include information on CPMVDs for each of the CPs, and the decoding apparatus may derive the CPMVDs for each of the CPs of the current block based on the information on the CPMVDs for each of the CPs.

The decoding apparatus derives Control Point Motion Vectors (CPMVs) for the CPs of the current block based on the CPMVPs and the CPMVDs (S1840). The decoding apparatus may derive the CPMVs for each CP based on the CPMVPs and the CPMVDs for each of the CPs. For example, the decoding apparatus may derive the CPMV for the CP by adding the CPMVPs and the CPMVDs for each CP.

The decoding apparatus derives prediction samples for the current block based on the CPMVs (S1850). The decoding apparatus may derive sub-block units or sample units of motion vectors of the current block based on the CPMVs. That is, the decoding apparatus may derive the motion vector of each sub-block or each sample of the current block. The sub-block unit or sample unit motion vectors may be derived based on Equation 1 or Equation 3, which are described above. The motion vectors may be indicated as a Motion Vector Field (MVF) or a motion vector array.

The decoding apparatus may derive prediction samples for the current block based on the sub-block unit or sample unit motion vectors. The decoding apparatus may derive a reference area within a reference picture based on the sub-block unit or sample unit motion vectors and may generate a prediction sample of the current block based on a reconstructed sample within the reference area.

The decoding apparatus generates a reconstructed picture for the current block based on the derived prediction samples (S1860). The decoding apparatus may generate a reconstructed picture for the current block based on the derived prediction samples. The decoding apparatus may immediately use a prediction sample as a reconstructed sample in accordance with the prediction mode, or the decoding apparatus may generate a reconstructed sample by adding a residual sample to the prediction sample. In case a residual sample exists for the current block, the decoding apparatus may obtain information on residual for the current block from the bitstream. The information on residual may include a transform coefficient related to the residual sample. The decoding apparatus may derive the residual sample (or residual sample array) for the current block based on the residual information. The decoding apparatus may generate a reconstructed sample based on the prediction sample and the residual sample, and the decoding apparatus may derive a reconstructed block or a reconstructed picture based on the reconstructed sample. Afterwards, as described above, in order to enhance subjective/objective picture quality as needed, the decoding apparatus may apply in-loop filtering procedures, such as de-blocking filtering and/or SAO procedure(s), to the reconstructed picture.

Figure 19:
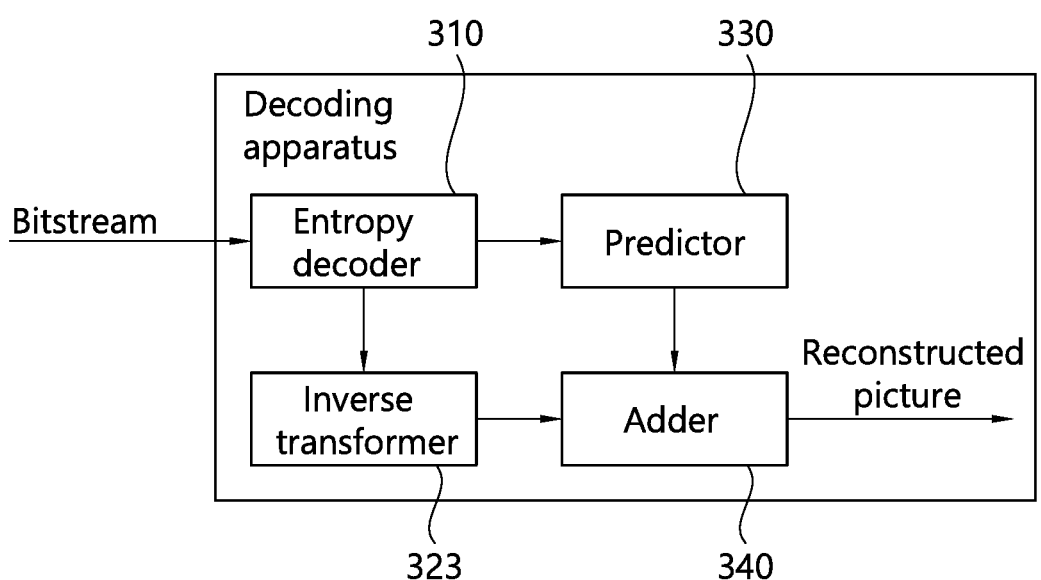
FIG. 19 illustrates a general view of a decoding apparatus performing an image decoding method according to the present disclosure.

FIG. 19 illustrates a general view of a decoding apparatus performing an image decoding method according to the present disclosure. The method disclosed in FIG. 18 may be performed by the decoding apparatus disclosed in FIG. 19. More specifically, for example, an entropy decoder of the decoding apparatus of FIG. 19 may perform step S1800 of FIG. 18, a predictor of the decoding apparatus of FIG. 19 may perform steps S1810 to S1850 of FIG. 18, and an adder of the decoding apparatus of FIG. 19 may perform step S1860. Additionally, although it is not shown in the drawing, a process of obtaining information on a residual for the current block through a bitstream may be performed by an entropy decoder of the decoding apparatus of FIG. 19, and a process of deriving the residual sample for the current block based on the residual information may be performed by an inverse transformer of the decoding apparatus of FIG. 19.

According to the above-described present disclosure, efficiency in image coding based on affine motion prediction may be enhanced.

According to the above-described present disclosure, when deriving an affine MVP candidate list, neighboring blocks are divided into a left block group and a top block group, and an affine MVP candidate list may be constructed by deriving MVP candidates from each block group. Thus, the complexity in the process of constructing the affine MVP candidate list may be reduced, and the coding efficiency may be enhanced.

In the above embodiments, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

The embodiments described in this document may be implemented and performed on a processor, a microprocessor, a controller, or a chip. For example, the functional units shown in each drawing may be implemented and performed on a computer, processor, microprocessor, controller, or chip. In this case, information (e.g., information on instructions) or an algorithm for implementation may be stored in a digital storage medium.

In addition, the decoding apparatus and the encoding apparatus to which the present disclosure is applied can be applied to multimedia communication devices such as a multimedia broadcasting transmitting and receiving device, a mobile communication terminal, a home cinema video device, a digital cinema video device, a surveillance camera, a video chatting device, (3D) video devices, video telephony video devices, and medical video devices, and the like, which may be included in, for example, a storage medium, a camcorder, a video on demand (VoD) service provision device, an Over the top video (OTT video), an Internet streamlining service providing device, a 3D video device, a video call device, a transportation means terminal (e.g., vehicle terminal, airplane terminal, ship terminal, and so on) and may be used to process video signals or data signals. For example, the over the top video (OTT video) device may include a game console, a Blu-ray player, an Internet access TV, a home theater system, a smartphone, a tablet PC, a Digital Video Recorder (DVR).

Further, the processing method to which the present disclosure is applied may be produced in the form of a computer-executed program, and may be stored in a computer-readable recording medium. The multimedia data having the data structure according to the present disclosure can also be stored in a computer-readable recording medium. The computer-readable recording medium includes all kinds of storage devices and distributed storage devices in which computer-readable data is stored. The computer-readable recording medium may be, for example, a Blu-ray Disc (BD), a Universal Serial Bus (USB), a ROM, a PROM, an EPROM, an EEPROM, a RAM, a CD-ROM, electromagnetic tape, a floppy disk, and optical data storage devices. In addition, the computer-readable recording medium includes media implemented in the form of a carrier wave (for example, transmission over the Internet). In addition, the bit stream generated by the encoding method can be stored in a computer-readable recording medium or transmitted over a wired or wireless communication network.

Further, an embodiment of the present disclosure may be implemented as a computer program product by program code, and the program code may be executed in a computer according to an embodiment of the present disclosure. The program code may be stored on a carrier readable by a computer.

Figure 20:
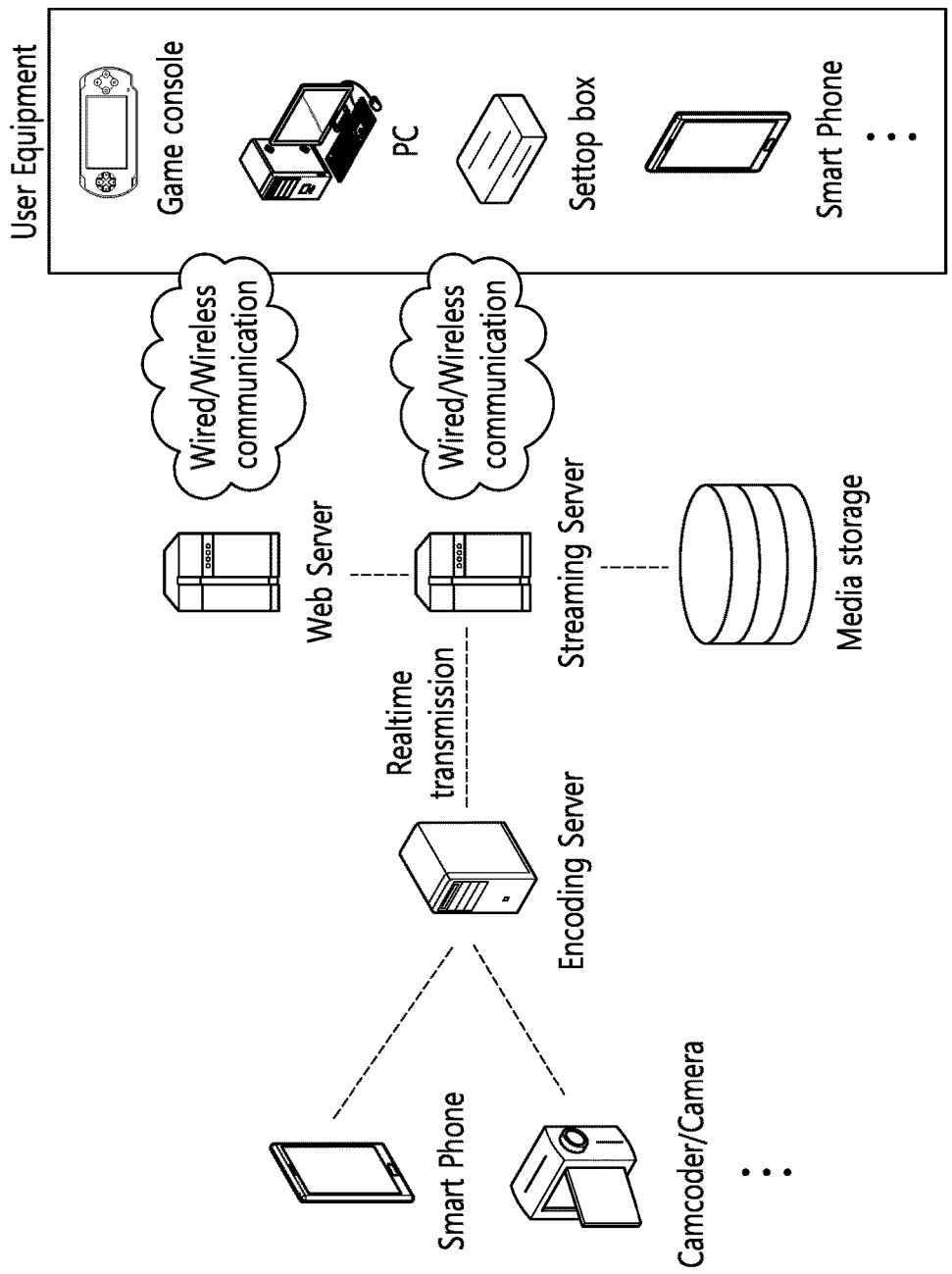
FIG. 20 illustrates a content streaming system structure to which the present disclosure is applied.

FIG. 20 illustrates a content streaming system structure to which the present disclosure is applied.

A content streaming system to which the present disclosure is applied may include an encoding server, a streaming server, a web server, a media storage, a user device, and a multimedia input device.

The encoding server compresses content input from multimedia input devices, such as smartphones, cameras, camcorders, and so on, into digital data to generate a bitstream and transmit the bitstream to the streaming server. As another example, when multimedia input devices, such as smartphones, cameras, camcorders, and so on, directly generate a bitstream, the encoding server may be omitted.

The bitstream may be generated by an encoding method or a bitstream generating method to which the present disclosure is applied, and the streaming server may temporarily store the bitstream in the process of transmitting or receiving the bitstream.

The streaming server transmits multimedia data to the user device based on a user request through the web server, and the web server serves as an intermediary for informing the user of what services are provided. When a user requests a desired service from the web server, the web server delivers it to a streaming server, and the streaming server transmits multimedia data to the user. Here, the content streaming system may include a separate control server, and, in this case, the control server controls a command/response between devices in the content streaming system.

The streaming server may receive content from a media repository and/or an encoding server. For example, when content is received from the encoding server, the content may be received in real time. In this case, in order to provide a smooth streaming service, the streaming server may store the bitstream for a predetermined time.

Examples of the user device include a mobile phone, a smartphone, a laptop computer, a digital broadcasting terminal, a personal digital assistant (PDA), a portable multimedia player (PMP), a navigation device, and a slate PC, a tablet PC, ultrabook, a wearable device (e.g., smartwatch, glass glasses, head mounted display), a digital TV, a desktop computer, a digital signage, and so on. Each server in the content streaming system may operate as a distributed server, and in this case, data received from each server may be processed in a distributed manner.

What is claimed is:

1. A video decoding method performed by a decoding apparatus, comprising:
    obtaining motion prediction information for a current block from a bitstream;
    obtaining residual information for the current block from the bitstream;
    constructing an affine motion vector predictor (MVP) candidate list including affine MVP candidates for the current block, wherein the affine MVP candidates include a first affine MVP candidate and a second affine MVP candidate;
    deriving control point motion vector predictors (CPMVPs) for control points (CPs) of the current block based on CPMVP candidates of one of the affine MVP candidates included in the affine MVP candidate list;
    deriving control point motion vector differences (CPMVDs) for the CPs of the current block based on the motion prediction information;
    deriving control point motion vectors (CPMVs) for the CPs of the current block based on the CPMVPs and the CPMVDs;
    deriving prediction samples for the current block based on the CPMVs;
    deriving residual samples of the current block based on the residual information; and
    generating a reconstructed picture for the current block based on the derived prediction samples and the derived residual samples,
    wherein CPMVs derived based on an affine motion model of a first block in a left block group including a bottom-left corner neighboring block and a left neighboring block are derived as CPMVP candidates of the first affine MVP candidate,
    wherein the first block is coded with the affine motion model of the first block and a reference picture of the first block is same as a reference picture of the current block,
    wherein CPMVs derived based on an affine motion model of a second block in a top block group including a top-right corner neighboring block, a top neighboring block, and a top-left corner neighboring block are derived as CPMVP candidates of the second affine MVP candidate, and
    wherein the second block is coded with the affine motion model of the second block and a reference picture of the second block is same as the reference picture of the current block.

2. The method of claim 1, wherein the first block is a first block verified to be satisfying a condition when checking neighboring blocks within the left block group according to a specific order.

3. The method of claim 1, wherein the second block is a first block verified to be satisfying a condition when checking neighboring blocks within the top block group according to a specific order.

4. The method of claim 3, wherein the specific order is an order starting from the top neighboring block to the top-right corner neighboring block and the top-left corner neighboring block.

5. The method of claim 1, wherein the motion prediction information includes an affine MVP candidate index for the current block, and
    wherein the CPMVPs for the CPs of the current block are derived based on CPMVP candidates of an affine MVP candidate being indicated by the affine MVP candidate index.

6. The method of claim 1, wherein the step of constructing an affine motion vector predictor (MVP) candidate list, comprises:
    dividing motion vectors of neighboring blocks of the current block into a first group, a second group, and a third group; and
    deriving a CPMVP candidate for CP0 of the current block from the first group, a CPMVP candidate for CP1 of the current block from the second group, and a CPMVP candidate for CP2 of the current block from the third group, and deriving a constructed affine MVP candidate including CPMVP candidates for the CPs.

7. The method of claim 6, wherein the neighboring blocks include neighboring block A, neighboring block B, neighboring block C, neighboring block D, neighboring block E, neighboring block F, and neighboring block G, and
    wherein, in case a size of the current block is W×H, and an x component and a y component of a top-left sample position of the current block are 0, the neighboring block A is a block including a sample of coordinates (−1, −1), the neighboring block B is a block including a sample of coordinates (0, −1), the neighboring block C is a block including a sample of coordinates (−1, 0), the neighboring block D is a block including a sample of coordinates (W−1, −1), the neighboring block E is a block including a sample of coordinates (W, −1), the neighboring block F is a block including a sample of coordinates (−1, H−1), and the neighboring block G is a block including a sample of coordinates (−1, H).

8. The method of claim 7, wherein the first group includes a motion vector of the neighboring block A, a motion vector of the neighboring block B, and a motion vector of the neighboring block C, wherein the second group includes a motion vector of the neighboring block D and a motion vector of the neighboring block E, and wherein the third group includes a motion vector of the neighboring block F and a motion vector of the neighboring block G.

9. The method of claim 8, wherein the CPMVP for CP0 is a motion vector having a reference picture first verified to be the same as a reference picture of the current block, when checking motion vectors within the first group according to a specific order, wherein the specific order is an order starting from the neighboring block A to the neighboring block B and the neighboring block C.

10. The method of claim 8, wherein the CPMVP for CP1 is a motion vector having a reference picture first verified to be the same as a reference picture of the current block, when checking motion vectors within the second group according to a specific order, wherein the specific order is an order starting from the neighboring block D to the neighboring block E.

11. The method of claim 8, wherein the CPMVP for CP2 is a motion vector having a reference picture first verified to be the same as a reference picture of the current block, when checking motion vectors within the third group according to a specific order, wherein the specific order is an order starting from the neighboring block F to the neighboring block G.

12. A video encoding method performed by an encoding apparatus, comprising:
constructing an affine motion vector predictor (MVP) candidate list including affine MVP candidates for a current block, wherein the affine MVP candidates include a first affine MVP candidate and a second affine MVP candidate;
deriving control point motion vector predictors (CPMVPs) for control points (CPs) of the current block based on CPMVP candidates of one of the affine MVP candidates included in the affine MVP candidate list;
deriving control point motion vectors (CPMVs) for the CPs of the current block;
deriving control point motion vector differences (CPMVDs) for the CPs of the current block based on the CPMVPs and the CPMVs;
generating motion prediction information including information on the CPMVDs; and
encoding the motion prediction information and residual information for the current block,
wherein CPMVs derived based on an affine motion model of a first block in a left block group including a bottom-left corner neighboring block and a left neighboring block are derived as CPMVP candidates of the first affine MVP candidate,
wherein the first block is coded with the affine motion model of the first block and a reference picture of the first block is same as a reference picture of the current block,
wherein CPMVs derived based on an affine motion model of a second block in a top block group including a top-right corner neighboring block, a top neighboring block, and a top-left corner neighboring block are derived as CPMVP candidates of the second affine MVP candidate, and
wherein the second block is coded with the affine motion model of the second block and a reference picture of the second block is same as the reference picture of the current block.

13. The method of claim 12, wherein the first block is a first block verified to be satisfying a condition when checking neighboring blocks within the left block group according to a specific order.

14. The method of claim 12, wherein the second block is a first block verified to be satisfying a condition when checking neighboring blocks within the top block group according to a specific order.

15. The method of claim 14, wherein the specific order is an order starting from the top neighboring block to the top-right corner neighboring block and the top-left corner neighboring block.

16. A non-transitory computer-readable storage medium storing a bitstream generated by steps of:
constructing an affine motion vector predictor (MVP) candidate list including affine MVP candidates for a current block, wherein the affine MVP candidates include a first affine MVP candidate and a second affine MVP candidate;
deriving control point motion vector predictors (CPMVPs) for control points (CPs) of the current block based on CPMVP candidates of one of the affine MVP candidates included in the affine MVP candidate list;
deriving control point motion vectors (CPMVs) for the CPs of the current block;
deriving control point motion vector differences (CPMVDs) for the CPs of the current block based on the CPMVPs and the CPMVs;
generating motion prediction information including information on the CPMVDs; and
encoding the motion prediction information and residual information for the current block to output the bitstream,
wherein CPMVs derived based on an affine motion model of a first block in a left block group including a bottom-left corner neighboring block and a left neighboring block are derived as CPMVP candidates of the first affine MVP candidate,
wherein the first block is coded with the affine motion model of the first block and a reference picture of the first block is same as a reference picture of the current block,
wherein CPMVs derived based on an affine motion model of a second block in a top block group including a top-right corner neighboring block, a top neighboring block, and a top-left corner neighboring block are derived as CPMVP candidates of the second affine MVP candidate, and
wherein the second block is coded with the affine motion model of the second block and a reference picture of the second block is same as the reference picture of the current block.

* * * * *